United States Patent
Aoyama

(10) Patent No.: US 10,164,764 B2
(45) Date of Patent: Dec. 25, 2018

(54) INTER-VEHICLE COMMUNICATION SYSTEM AND INTER-VEHICLE COMMUNICATION METHOD

(71) Applicant: HONDA MOTOR CO., LTD., Tokyo (JP)

(72) Inventor: Chiaki Aoyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 55 days.

(21) Appl. No.: 15/449,242

(22) Filed: Mar. 3, 2017

(65) Prior Publication Data

US 2017/0279594 A1   Sep. 28, 2017

(30) Foreign Application Priority Data

Mar. 25, 2016 (JP) .................. 2016-062187

(51) Int. Cl.

| | |
|---|---|
| H04B 10/03 | (2013.01) |
| H04L 7/00 | (2006.01) |
| H04B 10/61 | (2013.01) |
| H04L 29/08 | (2006.01) |
| H04B 10/114 | (2013.01) |
| H04W 4/00 | (2018.01) |
| H04L 5/00 | (2006.01) |
| H04W 4/46 | (2018.01) |

(52) U.S. Cl.
CPC ........ *H04L 7/0075* (2013.01); *H04B 10/1143* (2013.01); *H04B 10/6165* (2013.01); *H04L 7/0037* (2013.01); *H04L 67/1095* (2013.01); *H04L 67/12* (2013.01); *H04W 4/00* (2013.01); *H04L 5/0048* (2013.01); *H04L 5/0091* (2013.01); *H04W 4/46* (2018.02)

(58) Field of Classification Search
CPC ... H04L 7/0075; H04L 5/0048; H04L 7/0037; H04L 67/1095; H04L 67/12; H04B 10/6165

See application file for complete search history.

(56) References Cited

U.S. PATENT DOCUMENTS

| | | | |
|---|---|---|---|
| 8,199,052 B1* | 6/2012 | Alexander | G01S 19/53 342/357.36 |
| 9,609,595 B2* | 3/2017 | Yamashiro | H04W 4/04 |
| 2016/0094290 A1* | 3/2016 | Nishino | H04B 10/564 701/517 |
| 2017/0270801 A1* | 9/2017 | Kurata | H04W 84/18 |

FOREIGN PATENT DOCUMENTS

JP   3427187   5/2003

\* cited by examiner

*Primary Examiner* — Tesfaldet Bocure
(74) *Attorney, Agent, or Firm* — Rankin, Hill & Clark LLP

(57) ABSTRACT

In an inter-vehicle communication system, a first terminal included in a first vehicle includes a first control unit that receives a first relative phase between a third vehicle and a second vehicle transmitted by a second terminal included in the second vehicle and calculates, based on the received first relative phase and a second relative phase between the first vehicle and the second vehicle, a third relative phase between the first vehicle and the third vehicle, and the second terminal includes a second control unit that transmits the first relative phase to the first vehicle.

8 Claims, 15 Drawing Sheets

| SYNCHRONIZATION CLASS | ERROR RANGE | | |
|---|---|---|---|
| | ~0.3m | ~3m | ~30m |
| 0 | 100 SEC | 300 SEC | 300 SEC |
| 1 | 10 SEC | 100 SEC | 300 SEC |
| 2 | 1 SEC | 10 SEC | 100 SEC |
| 3 | EACH TIME | EACH TIME | EACH TIME |

INTER-VEHICLE COMMUNICATION SYSTEM AND INTER-VEHICLE COMMUNICATION METHOD

CROSS-REFERENCE TO RELATED APPLICATION

Priority is claimed on Japanese Patent Application No. 2016-062187, filed on Mar. 25, 2016, the contents of which are incorporated herein by reference.

BACKGROUND

Field of the Invention

The present invention relates to an inter-vehicle communication system and an inter-vehicle communication method.

Background

In the related art, optical communication systems using light have been proposed. In an optical communication system, a transmission device includes a light-emitting element such as an LED (Light-Emitting Diode) and transmits information by emitting light having a modulated intensity according to the light-emitting element. A reception device includes a photodiode and receives information by receiving and demodulating the light emitted by the transmission device. The reception device performs demodulation corresponding to intensity modulation, for example, by reading out an electric charge generated by photoelectric conversion in the photodiode a plurality of times during one period of a carrier wave formed of the intensity-modulated light.

Japanese Patent No. 3427187 discloses a technology in which an optical communication using LEDs (Light-Emitting Diodes) between vehicles is used to measure a relative phase to each other.

SUMMARY

However, according to the technique disclosed in Japanese Patent No. 3427187, in a case of one-to-one vehicles capable of communicating with each other, a relative phase between vehicles can be measured by performing transmission and reception of a beat signal; however, in a case where the distance between vehicles is a distance in which the vehicles cannot communicate with each other, it is impossible to measure the distance.

An object of an aspect of the present invention is to provide an inter-vehicle communication system and an inter-vehicle communication method capable of measuring a distance between vehicles even when the distance between the vehicles is a distance in which the vehicles cannot communicate with each other.

(1) An inter-vehicle communication system according to an aspect of the present invention is a communication system between a first vehicle and a second vehicle, wherein a first terminal included in the first vehicle includes a first control unit that receives a first relative phase between a third vehicle and the second vehicle transmitted by a second terminal included in the second vehicle and calculates, based on the received first relative phase and a second relative phase between the first vehicle and the second vehicle, a third relative phase between the first vehicle and the third vehicle, and the second terminal includes a second control unit that transmits the first relative phase to the first vehicle.

(2) In the above aspect (1), an N-th (N is an integer of any one of one to three) control unit of an N-th terminal included in an N-th vehicle may: transmit, to another vehicle, a transmission signal including information indicating a relative time and an identifier by which a vehicle is identified; receive the transmission signal transmitted by said another vehicle; measure, based on information indicating a relative time in another vehicle included in the received transmission signal and information indicating a relative time in a vehicle, an N-th delay time between the N-th vehicle and an M-th (M is an integer of any one of one to three other than N) vehicle in the N-th vehicle; transmit the measured N-th delay time to the M-th vehicle; receive an M-th delay time between the N-th vehicle and the M-th vehicle in the M-th vehicle transmitted by the M-th vehicle; calculate a relative phase between the N-th vehicle and the M-th vehicle by using the N-th delay time and the M-th delay time; and calculate, based on the calculated relative phase and the measured N-th delay time, a distance between the N-th vehicle and the M-th vehicle.

(3) In the above aspect (2), an O-th (O is an integer of any one of one to three other than N and M) control unit of an O-th vehicle may: transmit the transmission signal to another vehicle; receive the transmission signal transmitted by said another vehicle; measure, based on information indicating a relative time in another vehicle included in the received transmission signal and information indicating a relative time in a vehicle, an O-th delay time between the M-th vehicle and the O-th vehicle in the O-th vehicle; and transmit the measured O-th delay time to the M-th vehicle, and the M-th control unit of the M-th vehicle may: measure, based on information indicating a relative time in another vehicle included in the received transmission signal and information indicating a relative time in a vehicle, a delay time between the M-th vehicle and the O-th vehicle in the M-th vehicle; calculate a relative phase between the M-th vehicle and the O-th vehicle by using the O-th delay time and a delay time between the M-th vehicle and the O-th vehicle in the M-th vehicle; and transmit, to the N-th vehicle, the calculated relative phase between the M-th vehicle and the O-th vehicle.

(4) In the above aspect (3), the N-th control unit of the N-th vehicle may: receive the transmission signal transmitted by the O-th vehicle when the O-th vehicle is present at a communicable distance; measure, based on information indicating a relative time in another vehicle included in the received transmission signal and information indicating a relative time in a vehicle, a delay time between the N-th vehicle and the O-th vehicle in the N-th vehicle; and calculate, based on the calculated relative phase between the N-th vehicle and the M-th vehicle, the received relative phase between the M-th vehicle and the O-th vehicle, and the measured delay time between the N-th vehicle and the O-th vehicle in the N-th vehicle, a distance between the N-th vehicle and the O-th vehicle.

(5) In any one of the above aspects (2) to (4), the transmission signal may include a synchronization class indicating an accuracy of a reference signal used by the control unit, and the control unit may change, based on a first synchronization class in the control unit and a second synchronization class in the control unit of another vehicle, a communication interval of performing transmission and reception.

(6) In any one of the above aspects (2) to (5), the terminal included in the vehicle may include a light reception unit that receives a light emission signal which is a transmission signal from said another vehicle, the control unit may calculate, based on a phase difference detected by the light reception unit, a distance between a vehicle and said another vehicle, the light reception unit may include: a photoelectric conversion unit in which a plurality of pixels are arranged and each of the pixels generates an electric charge corresponding to an exposure amount; a first electric charge accumulation unit that accumulates the electric charge generated by the photoelectric conversion unit; m (m is an integer of four or more) sort gate units that are provided between the photoelectric conversion unit and an electric charge accumulation unit and control entering of an electric charge from the photoelectric conversion unit to the electric charge accumulation unit according to opening and closing; and (m−1) second to m-th electric charge accumulation units that accumulate the electric charge generated from the photoelectric conversion unit, and one of the m sort gate units may include a delayed pulse that starts at each predetermined time and at each predetermined number of times and that has a delayed pulse timing.

(7) In any one of the above aspects (2) to (4), the control unit may transmit the transmission signal, the delay time, and the relative phase using different communication means.

(8) An inter-vehicle communication method according to another aspect of the present invention is an inter-vehicle communication method in an inter-vehicle communication system including a first vehicle that includes a first terminal that includes a first control unit, a second vehicle that includes a second terminal that includes a second control unit, and a third vehicle that includes a third terminal that includes a third control unit, the method including: (a) by way of the second control unit, transmitting a first relative phase between the second vehicle and the third vehicle to the first vehicle; (b) by way of the first control unit, receiving the first relative phase transmitted in (a); and (c) by way of the first control unit, calculating, based on the first relative phase received in (b) and a second relative phase between the first vehicle and the second vehicle, a third relative phase between the first vehicle and the third vehicle.

According to the configuration of (1) or (8) described above, even when the first terminal included in the first vehicle and the third terminal included in the third vehicle are at a distance in which the vehicles cannot directly communicate with each other, it is possible to share the relative phase via the second terminal included in the second vehicle, and therefore, it is possible to measure the relative phase between the first vehicle and the third vehicle. Thereby, according to the configuration of (1) or (8), when the first vehicle and the third vehicle become a state in which the vehicles can directly communicate with each other, it is possible to omit a time during which the vehicles synchronize with each other.

According to the configuration of (2) described above, by mutually performing transmission and reception of the transmission signal between two vehicles, it is possible to measure the delay time between the N-th vehicle and the M-th vehicle in the N-th vehicle and the delay time between the N-th vehicle and the M-th vehicle in the M-th vehicle. According to the configuration of (2), by using the measured delay time between the N-th vehicle and the M-th vehicle in the N-th vehicle and the measured delay time between the N-th vehicle and the M-th vehicle in the M-th vehicle, it is possible to calculate the relative phase between the N-th vehicle and the M-th vehicle. According to the configuration of (2), it is possible to omit a time during which the vehicles synchronize with each other, and it is possible to calculate and thereby measure the distance between the N-th vehicle and the M-th vehicle based on the calculated relative phase and the measured N-th delay time.

According to the configuration of (3) described above, by mutually performing transmission and reception of the transmission signal between the M-th vehicle and the O-th vehicle, it is possible to calculate the relative phase between the M-th vehicle and the O-th vehicle. According to the configuration of (3), the terminal of the M-th vehicle transmits the calculated relative phase between the M-th vehicle and the O-th vehicle to the N-th vehicle, and thereby, the terminal of the N-th vehicle can share the relative phase between the M-th vehicle and the O-th vehicle. Thereby, the terminal of the N-th vehicle can calculate the relative phase between the N-th vehicle and the O-th vehicle by using the relative phase between the N-th vehicle and the M-th vehicle and the relative phase between the M-th vehicle and the O-th vehicle.

According to the configuration of (4) described above, when direct communication becomes available, the terminal of the N-th vehicle measures the delay time between the N-th vehicle and the O-th vehicle. Then, the terminal of the N-th vehicle can calculate and thereby measure the distance between the N-th vehicle and the O-th vehicle based on the calculated relative phase between the N-th vehicle and the O-th vehicle and the measured delay time between the N-th vehicle and the O-th vehicle.

According to the configuration of (5) described above, it is possible to change the transmission interval and the reception interval corresponding to the synchronization class included in the transmission signal, and therefore, it is possible to reduce the communication amount.

According to the configuration of (6) described above, the start timing of one pulse of the sort gate units is delayed at each predetermined time and at each predetermined number of times, and thereby, it is possible to measure the delay time.

According to the configuration of (7) described above, the transmission signal, the delay time, and the relative phase are transmitted using different communication means, and therefore, it is possible to transmit the transmission signal which is required to be transmitted at each time since the transmission signal is required to calculate the distance, and the delay time and the relative phase that may be transmitted when the delay time and the relative phase can be calculated at a different timing. Thereby, according to the configuration of (7), it is possible to reduce the communication amount.

DESCRIPTION OF THE EMBODIMENTS

Hereinafter, an embodiment of the present invention is described with reference to the drawings.

Figure 1:
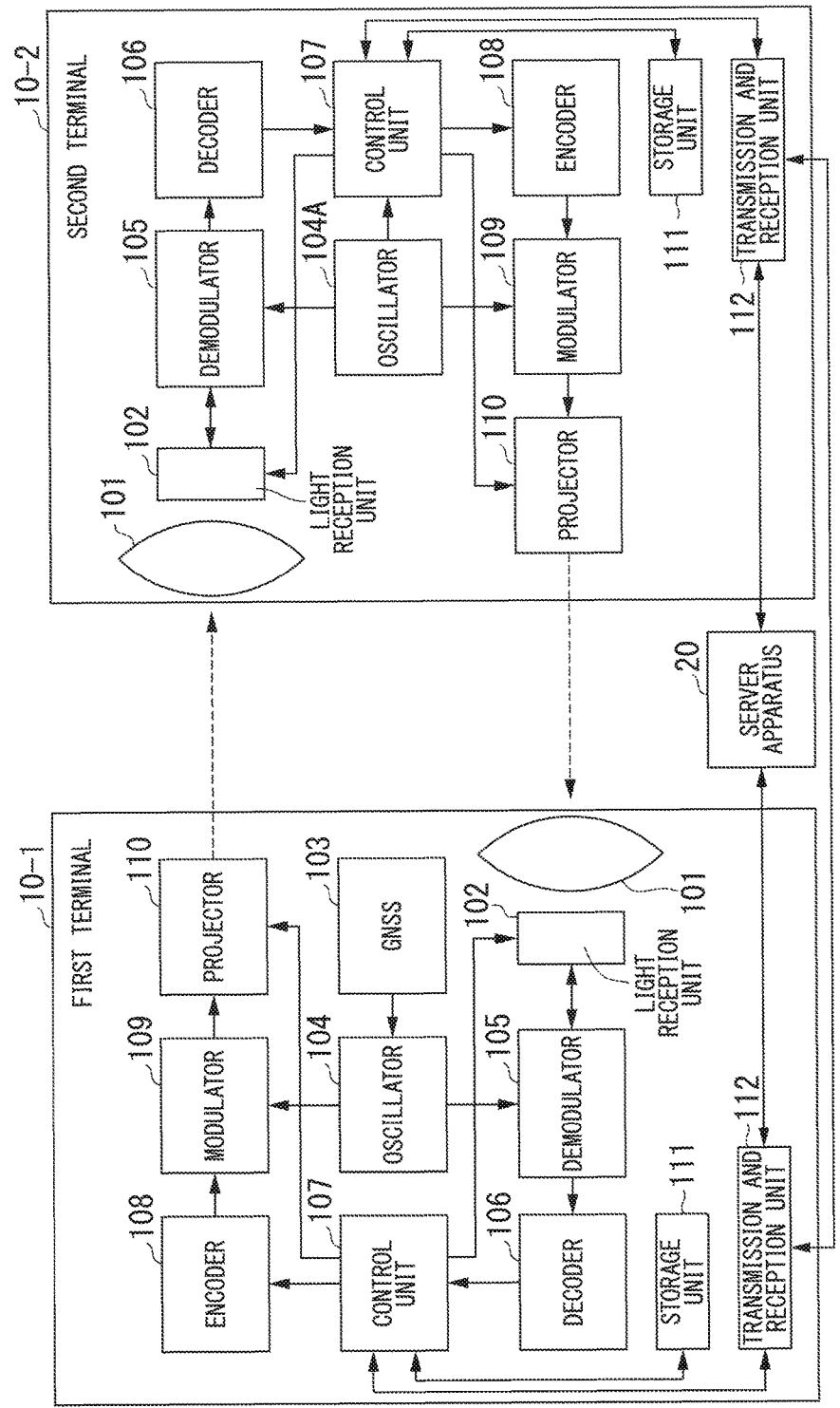
FIG. 1 is a system configuration view representing a configuration of a measurement system according to the present embodiment.

FIG. 1 is a system configuration view representing a configuration of an inter-vehicle communication system 1 according to the present embodiment.

As shown in FIG. 1, the inter-vehicle communication system 1 includes a first terminal 10-1, a second terminal 10-2, and a server apparatus 20. The following embodiment is described using an example in which the first terminal 10-1 is provided on a first vehicle, and the second terminal 10-2 is provided on a second vehicle.

In the following example, the same reference numeral is used for a configuration element having the same function. In the following description, when one of the first terminal 10-1 and the second terminal 10-2 is not specified, the first terminal 10-1 and the second terminal 10-2 are simply referred to also as a terminal 10.

As shown in FIG. 1, the first terminal 10-1 includes a lens 101, a light reception unit 102, a GNSS 103, an oscillator 104, a demodulator 105, a decoder 106, a control unit 107, an encoder 108, a modulator 109, a projector 110, a storage unit 111, and a transmission and reception unit 112.

The second terminal 10-2 includes a lens 101, a light reception unit 102, an oscillator 104A, a demodulator 105, a decoder 106, a control unit 107, an encoder 108, a modulator 109, a projector 110, a storage unit 111, and a transmission and reception unit 112.

Each of the lens 101, the light reception unit 102, and the projector 110 of the terminal 10 is provided at the front and at the rear with respect to the travel direction of the vehicle.

The first terminal 10-1 and the second terminal 10-2 encode an identifier (ID) by which the terminal is identified, a time code, and a synchronization class and transmit the encoded transmission signal to each other at a predetermined time. The synchronization class is information indicating a frequency accuracy of the oscillator 104 (or 104A) of each terminal 10. In the present embodiment, for example, a frequency accuracy of a level synchronized with the GNSS 103 is zero, a frequency accuracy of $10^{-10}$ or less is one, a frequency accuracy of more than $10^{-10}$ and $10^{-9}$ or less is two, and a frequency accuracy of $10^{-6}$ or more is three.

The n-th terminal 10-$n$ (n is one or two) receives a transmission signal transmitted by the m-th terminal 10-$m$ (m is one or two and is other than n) according to an optical communication and calculates a delay time when receiving the transmission signal from the m-th terminal 10-$m$ in response to the terminal transmitting the transmission signal. A calculation method of the delay time (lag time) is described below. The n-th terminal 10-$n$ converts the calculated delay time to the distance between the n-th vehicle on which the n-th terminal 10-$n$ is provided and the m-th vehicle on which the m-th terminal 10-$m$ is provided. The n-th terminal 10-$n$ associates the calculated delay time and the time code with the ID of the terminal to be transmitted to the m-th terminal 10-$m$ or the server apparatus 20 via a wireless communication. The n-th terminal 10-$n$ transmits a request that requests the delay time of the m-th terminal 10-$m$ to the m-th terminal 10-$m$ or the server apparatus 20 in order to acquire the delay time of the m-th terminal 10-$m$. The n-th terminal 10-$n$ receives the delay time transmitted by the m-th terminal 10-$m$ or the server apparatus 20 in response to the request. Thereby, the n-th terminal 10-$n$ and the m-th terminal 10-$m$ can share the delay time. In the present embodiment, a communication using the light reception unit 102 and the projector 110 is referred to as an optical communication, and a communication using the transmission and reception unit 112 is referred to as a wireless communication.

The server apparatus 20 receives the ID, the delay time, and the time code that are transmitted by the first terminal 10-1 or the ID of the second terminal 10-2, the delay time, and the time code that are transmitted by the second terminal 10-2 and stores each of the pairs of the ID of the terminal, the received ID, the delay time, and the time code. When receiving a request command from the terminal 10, the server apparatus 20 transmits the ID, the delay time, and the time code in response to the received request to the terminal 10 that has transmitted the request. Alternatively, the server apparatus 20 may preliminarily transmit, to the terminal 10 which is determined to be closely present according to a communication relationship, the ID, the delay time, and the time code that may be communicated.

First, the first terminal 10-1 is described.

The lens 101 transmits a light beam including phase modulation light which is a transmission signal emitted by another terminal 10 and environment light and forms an image of the transmitted light beam on the light reception unit 102. The terminal 10 may include an optical filter between the lens 101 and the light reception unit 102.

The light reception unit 102 has a structure in which a plurality of pixels are two-dimensionally arranged. The light reception unit 102 generates and accumulates an electric charge corresponding to the received light depending on the pixel and outputs, to the demodulator 105, the accumulated electric charge at a predetermined timing in response to the control of the control unit 107 as a reception signal.

The GNSS (Global Navigation Satellite System(s)) 103 is a positioning system using a satellite (not shown). The GNSS 103 extracts a reference signal from a signal received from the satellite and outputs the extracted reference signal to the oscillator 104.

The oscillator 104 corrects the generated synchronization signal corresponding to the reference signal input from the GNSS 103 and outputs the corrected synchronization signal to the demodulator 105 and the modulator 109. Alternatively, the oscillator 104 generates the synchronization signal by using the reference signal output by the GNSS 103 and outputs the generated synchronization signal to the demodulator 105 and the modulator 109.

The demodulator 105 performs demodulation with respect to the reception signal output by the light reception unit 102 corresponding to the modulation method used by the modulator 109 and outputs the demodulated reception signal to the decoder 106. The modulation method performed by the modulator 109 is, for example, a method such as the $2\pi/3$-DBPSK (Differential Binary Phase Shift Keying). The control of the pixel may be performed by the demodulator 105.

The decoder 106 decodes the reception signal demodulated by the demodulator 105 corresponding to the encoding used by the encoder 108 and outputs the decoded reception signal to the control unit 107.

The control unit 107 controls the pixel included in the light reception unit 102. The control unit 107 controls the projector 110. The control unit 107 generates transmission information by using information stored by the storage unit 111 and outputs the generated transmission information to the encoder 108. The control unit 107 receives transmission information from another terminal 10 output by the decoder 106 and extracts an ID and phase information of the carrier wave from the received transmission information. The control unit 107 sequentially stores the extracted information in the storage unit 111. The control unit 107 generates, in response to receiving the transmission information from another terminal 10, a signal including phase information at the time of reception, the ID of the terminal, and the time code in modulation light having the same frequency as the frequency of the received carrier wave and outputs the generated signal to the encoder 108. The control unit 107 acquires the ID of another terminal 10 and the delay time output by the transmission and reception unit 112. The control unit 107 outputs the ID of another terminal 10 and the delay time to the transmission and reception unit 112. The control unit 107 converts position information of the light reception unit which is a two-dimensional surface into angular information and then converts the position information into three-dimensional position information also by using distance information to obtain three-dimensional relative position information between vehicles.

The encoder 108 uses the signal (the ID and the time code) output by the control unit 107 as transmission information and encodes the transmission information to generate a bit sequence. The encoder 108 outputs the generated bit sequence to the modulator 109.

The modulator 109 modulates the bit sequence output by the encoder 108 by using the synchronization signal output by the oscillator 104, for example, in accordance with the DBPSK method to generate a carrier wave. The modulator 109 outputs the generated carrier wave to the projector 110.

The projector 110 performs phase modulation based on the carrier wave generated by the modulator 109 and transmits the phase modulation light which is a transmission signal applied with the phase modulation to another terminal 10 corresponding to the control of the control unit 107. The projector 110 includes an LED (Light-Emitting Diode) or a laser diode capable of transmitting, for example, a visible light pulse having, for example, a high rate (repetition frequency). The projector 110 may include an LED or a laser diode transmitting an infrared light pulse having a high rate.

The storage unit 111 stores: the ID of the terminal 10, the delay time of the terminal 10, and the time code of the terminal 10; the ID of another terminal 10, the delay time of the terminal 10 detected by another terminal 10, and the time code of another terminal 10; and a synchronization error.

The transmission and reception unit 112 transmits, to another terminal 10 or the server apparatus 20 via the wireless communication, the ID of the terminal 10, the delay time of another terminal 10 detected by the terminal 10, and the time code of the terminal 10 output by the control unit 107. The transmission and reception unit 112 receives, via the wireless communication, the ID of another terminal, the delay time of the terminal detected by another terminal 10, and the time code of another terminal transmitted by another terminal 10 or the server apparatus 20. In the present embodiment, the transmission and the reception are integrally referred to also as the transmission and reception.

Next, the second terminal 10-2 is described.

As shown in FIG. 1, the second terminal 10-2 does not include the GNSS 103. The difference between the first terminal 10-1 and the second terminal 10-2 is the oscillator 104A.

The oscillator 104A generates a synchronization signal used by the demodulator 105 and the modulator 109 and outputs the generated synchronization signal to the demodulator 105 and the modulator 109.

Next, a configuration of the light reception unit 102 is described.

Figure 2:
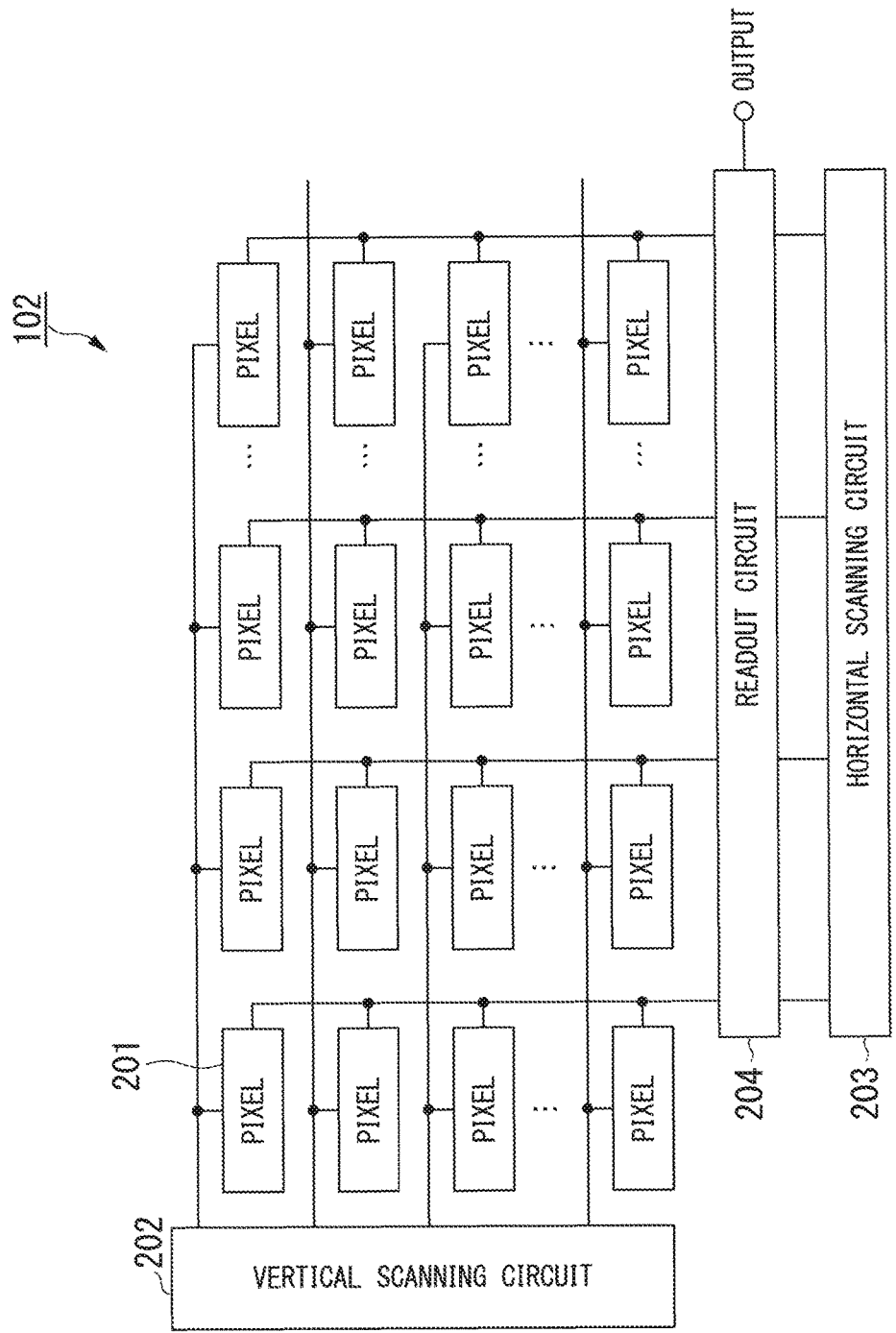
FIG. 2 is a schematic view representing a schematic configuration of a light reception unit according to the embodiment.

FIG. 2 is a schematic view representing a schematic configuration of the light reception unit 102 according to the present embodiment.

The light reception unit 102 includes a plurality of pixels 201, a vertical scanning circuit 202, a horizontal scanning circuit 203, and a readout circuit 204. The pixels 201 are arranged in a two-dimensional matrix form and receive light passing through the lens 101 to generate and accumulate an electric charge. The readout circuit 204 reads out a voltage level corresponding to the electric charges accumulated by each pixel 201 in response to the control by the vertical scanning circuit 202 and the horizontal scanning circuit 203. The voltage level which is read out is output to the demodulator 105 (FIG. 1) from the readout circuit 204.

In the present embodiment, when receiving a signal, the signal is read out after performing an exposure.

Next, a configuration of the pixel 201 is described.

Figure 3:
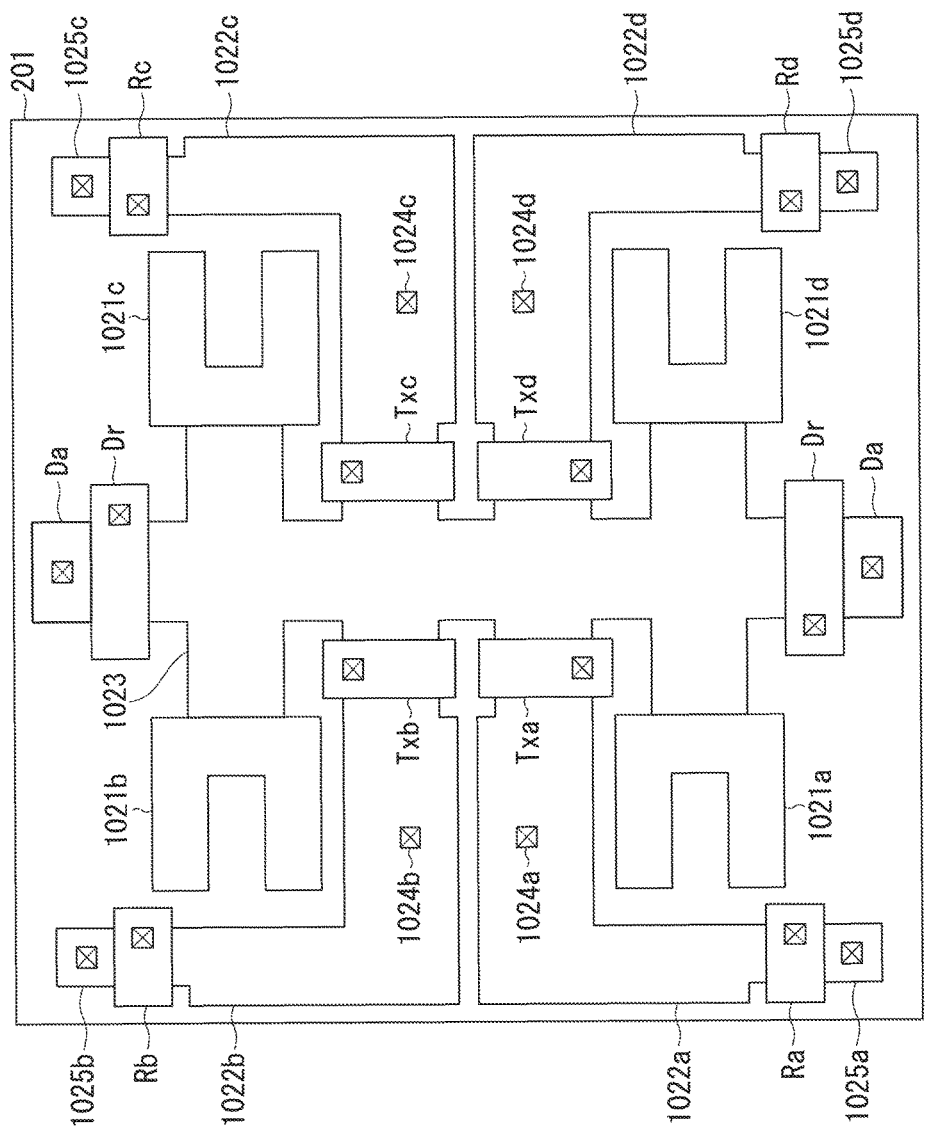
FIG. 3 is a configuration view representing a configuration of a pixel used for the light reception unit according to the embodiment.

FIG. 3 is a configuration view representing a configuration of the pixel 201 used for the light reception unit 102 according to the present embodiment.

A plurality of pixels are arranged in the light reception unit 102 as shown in FIG. 3. Each pixel 201 includes four micro conversion units 1021a to 1021d (photoelectric conversion unit). Each of the micro conversion units 1021a to 1021d is formed by using a photoelectric conversion element. The pixel 201 includes four electric charge accumulation regions 1022a to 1022d (electric charge accumulation unit) and sort gates Txa to Txd (sort gate units) each corresponding to each of the electric charge accumulation regions 1022a to 1022d.

The four micro conversion units 1021a to 1021d are connected to the electric charge accumulation regions 1022a to 1022d via an electric charge transfer region 1023 and the sort gates Txa to Txd.

Each of the micro conversion units 1021a to 1021d (photoelectric conversion unit) generates electric charges corresponding to the exposure amount.

One of the electric charge accumulation regions 1022a to 1022d (electric charge accumulation unit) accumulates the electric charges generated by each of the micro conversion units 1021a to 1021d.

The sort gate Txa is provided between the micro conversion unit 1021a (photoelectric conversion unit) and the electric charge accumulation region 1022a (electric charge accumulation unit) and controls entering of the electric charge from the micro conversion unit 1021a to the electric charge accumulation region 1022a according to opening and closing of the gate. Similarly, the sort gate Txf (f is any one of b, c, and d) is provided between the micro conversion unit 1021f (photoelectric conversion unit) and the electric charge accumulation region 1022f (electric charge accumulation unit) and controls entering of the electric charge from the micro conversion unit 1021f to the electric charge accumulation region 1022f according to opening and closing of the gate. In the present embodiment, a first electric charge accumulation unit is, for example, the electric charge accumulation region 1022d, and second to fourth electric charge accumulation units are electric charge accumulation regions 1022a to 1022c. A first sort gate unit is the sort gate Txa, and second to fourth sort gate units are the sort gates Txa to Txc.

The electric charge generated by photoelectric conversion in the micro conversion units 1021a to 1021d moves to the electric charge transfer region 1023 having a lower potential. When one of the sort gates Txa to Txd is opened, the electric charge moves from the electric charge transfer region 1023 to one of the electric charge accumulation regions 1022a to 1022d that corresponds to the opened one of the sort gates Txa to Txd. Then, the electric charge which has moved to each of the electric charge accumulation regions 1022a to 1022d is accumulated by each of the electric charge accumulation regions 1022a to 1022d until a predetermined timing. Then, the accumulated electric charge is read out at the predetermined timing from readout electrodes 1024a to 1024d via the readout circuit 204 (FIG. 2) to the demodulator 105 (FIG. 1).

The pixel 201 includes reset gates Ra to Rd and reset electrodes 1025a to 1025d each being adjacent to each of the electric charge accumulation regions 1022a to 1022d. When one of the reset gates Ra to Rd is opened, each of the electric charge accumulation regions 1022a to 1022d is charged by a voltage V applied to each of the reset electrodes 1025a to 1025d to be a reset state. The reset process is simultaneously performed to the electric charge accumulation regions 1022a to 1022d of all pixels 201 (FIG. 2) of the light reception unit 102 (FIG. 1).

The pixel 201 (FIG. 2) includes a drain gate Dr and a drain electrode Da.

When the drain gate Dr is opened, an excess electric charge of the charges accumulated in the electric charge transfer region 1023 moves to the drain electrode (drain terminal) Da. The excess electric charge is an accumulated electric charge, for example, when light having a higher intensity than a predetermined intensity is incident on the pixel 201. In this way, when light is incident at a higher intensity than the predetermined intensity, the drain gate Dr and the drain electrode Da are used in order to prevent the accumulated electric charge from overflowing to adjacent pixels.

Figure 4:
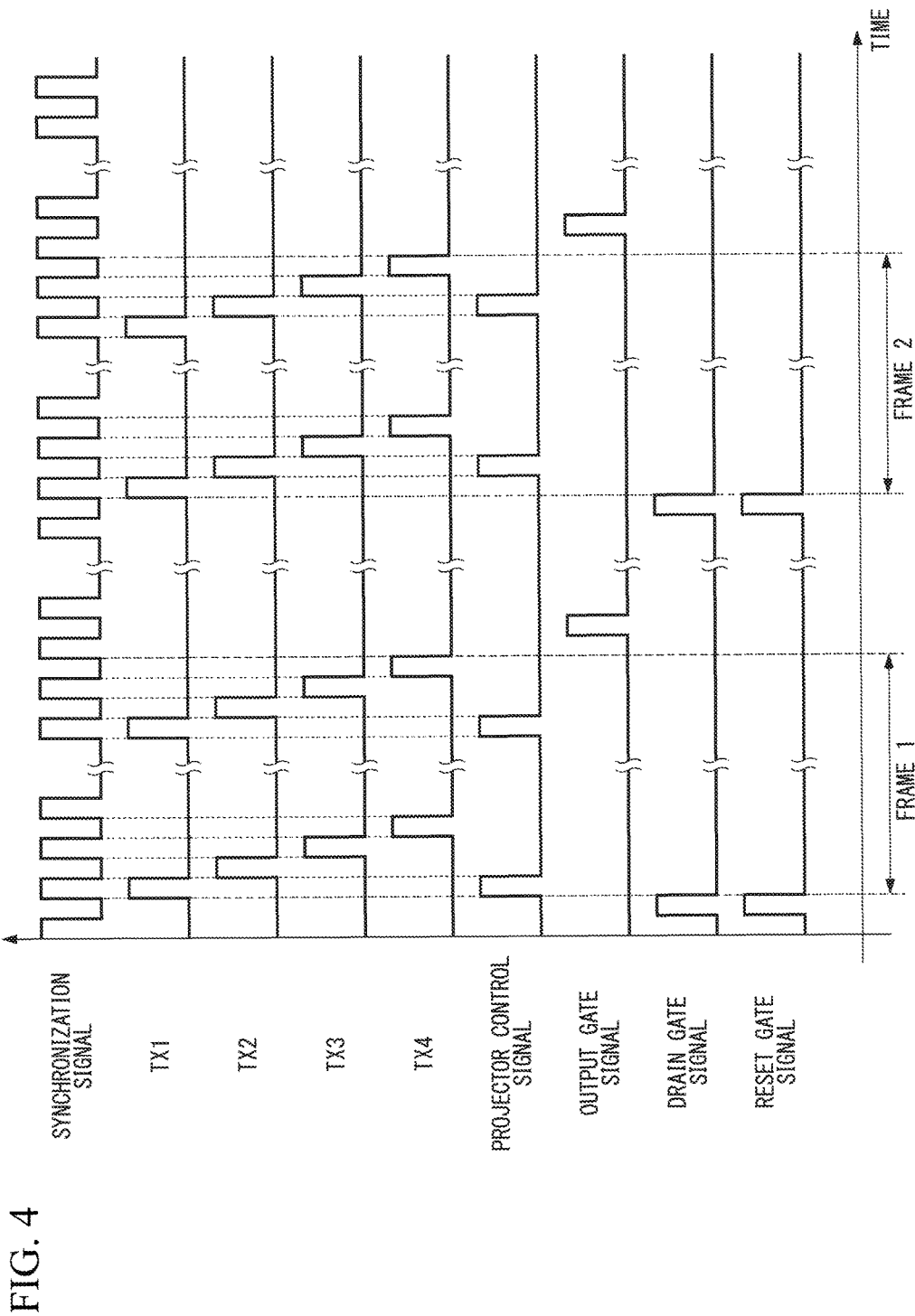
FIG. 4 is a timing chart showing an example of the control of each gate included in each pixel in the embodiment.

FIG. 4 is a timing chart showing an example of the control of each gate included in each pixel 201 in the present embodiment. In FIG. 4, the horizontal axis represents time, and the vertical axis represents the level of each signal.

The control unit 107 controls the operation of each pixel 201 by using a control signal synchronized with the synchronization signal generated by the oscillator 104. The control signal output to each pixel 201 from the control unit 107 includes signals TX1 to TX4, an output gate signal, a drain gate signal, and a reset gate signal as shown in FIG. 4.

One of the signals TX1 to TX4 is a signal for switching between an ON state and an OFF state of each of the transfer gates Txa to Txd. The output gate signal is a signal for commanding, to the readout circuit 204, the timing when the voltages of the electric charge accumulation regions 1022a to 1022d are read out. The drain gate signal is a signal for switching between an ON state and an OFF state of the drain gate Dr. The reset gate signal is a signal for switching between an ON state and an OFF state of the reset gates Ra to Rd. A projector control signal is a signal for switching between an ON state and an OFF state of the projector 110.

When the imaging (exposure) of a target object is started, the control unit 107 changes the drain gate signal and the reset gate signal to a H (high) level and resets the voltage of the electric charge transfer region 1023 and the voltages of the electric charge accumulation regions 1022a to 1022d to the voltage V.

The control unit 107 changes the drain gate signal and the reset gate signal to a L (low) level and then changes any one of the signals TX1 to TX4 sequentially to the H level to sequentially transfer and accumulate the electric charge generated at the micro conversion units 1021a to 1021d to the electric charge accumulation regions 1022a to 1022d. At this time, the control unit 107 causes the projector 110 to be in an ON state (light emission state) corresponding to the timing when any of the signals TX1 to TX4 becomes the H level to project a light signal to the target object. FIG. 4 shows an example in which light is projected in synchronization with the signal TX1 in Frame 1 and light is projected in synchronization with the signal TX2 in Frame 2.

When the number of times when an electric charge is transferred to each of the electric charge accumulation regions 1022a to 1022d reaches the predetermined number of transfer times n, the control unit 107 causes the signals TX1 to TX4 to be the L level and causes the transfer gates Txa to Txd to be in the OFF state.

Next, the control unit 107 changes the output gate signal to the H level and causes the readout circuit 204 to sequentially read out the voltages (potential) of the electric charge accumulation regions 1022a to 1022d included in each pixel 201. The control unit 107 generates a first image in Frame 1 corresponding to the voltage of the electric charge accumulation region 1022a of each pixel 201 which is read out by the readout circuit 204. Similarly, the control unit 107 generates second to fourth images in Frame 1 corresponding to the voltages of the electric charge accumulation regions 1022b to 1022d of each pixel 201 which is read out by the readout circuit 204.

When the readout by the readout circuit 204 with respect to each of the electric charge accumulation regions 1022a to 1022d is completed, the control unit 107 causes the drain gate signal and the reset gate signal to be the H level. The drain gate Dr causes the drain electrode Da and the electric charge transfer region 1023 to be in an electrically conducting state in response to the drain gate signal and resets the voltage decreased due to the electric charge generated in the micro conversion units 1021a to 1021d to the voltage V. The reset gates Ra to Rd cause the electric charge accumulation regions 1022a to 1022d and the reset electrodes 1025a to 1025d to be in an electrically conducting state in response to the reset gate signal and reset the voltages of the electric charge accumulation regions 1022a to 1022d decreased due to the electric charge transferred via the transfer gates Txa to Txd to the voltage V.

Subsequently, the control unit 107 repeats the above-described processes until first to fourth images of a predetermined frame number N are generated. In this repetition, the control unit 107 causes the projector 110 to project light to the target object in synchronization with any of the signals TX1 to TX4. The control unit 107 changes the signals TX1 to TX4 to be synchronized for each frame. For example, the signal synchronized with the light projection is switched in the order of signals TX1, TX2, TX3, TX4, TX1, . . . for each frame.

Next, a mutual communication between two terminals 10 and a calculation method of an inter-vehicle distance are described.

Figure 5:
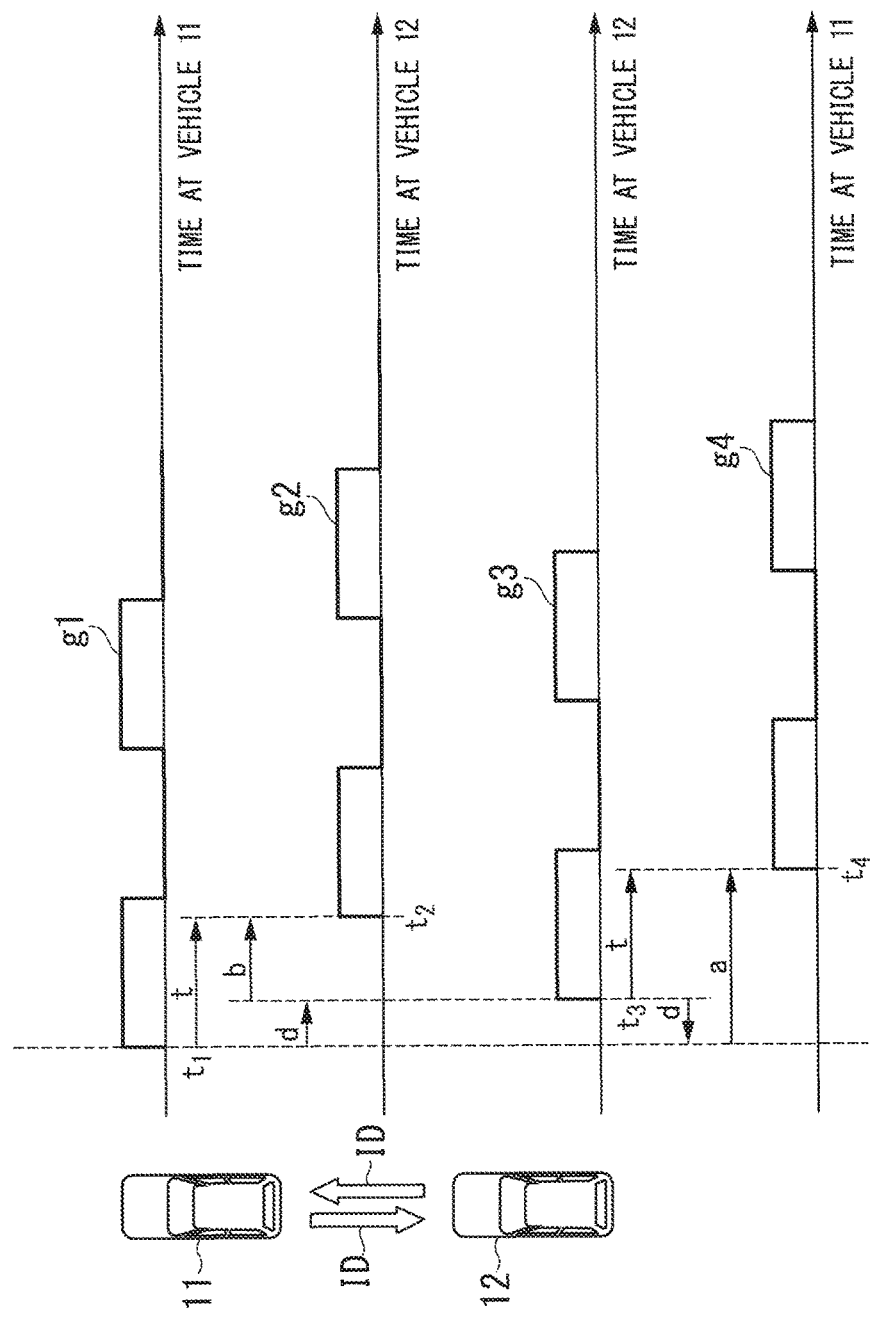
FIG. 5 is a view showing a mutual communication between two terminals according to the embodiment.

FIG. 5 is a view showing a mutual communication between two terminals 10 according to the present embodiment. In FIG. 5, the vertical axis represents whether the signal is the H (high) level or is the L (low) level, and the horizontal axis represents time. In the example shown in FIG. 5, a vehicle 11 is traveling in front of a vehicle 12 with respect to the travel direction of the vehicle 12.

A waveform g1 represents a transmission signal emitted by the vehicle 11. A waveform g2 represents a reception signal received by the vehicle 12 of the transmission signal emitted by the vehicle 11. A waveform g3 represents a transmission signal emitted by the vehicle 12. A waveform g4 represents a reception signal received by the vehicle 11 of the transmission signal emitted by the vehicle 12.

A time $t_1$ represents the timing when the vehicle 11 emits light. A time $t_2$ represents the timing when the vehicle 12 receives the light emitted by the vehicle 11. A time $t_3$ represents the timing when the vehicle 12 emits light. A time $t_4$ represents the timing when the vehicle 11 receives the light emitted by the vehicle 12.

Further, "t" represents a true delay time. "b" represents a delay time measured by using a reference time of the vehicle 12. "d" represents a synchronization error. In the present embodiment, the synchronization error is also referred to as a phase error. "a" represents a delay time measured by using a reference time of the vehicle 11. In the present embodiment, "a" and "b" are also referred to as an apparent delay time.

As shown in FIG. 5, the true delay time t is represented by the following Expression (1) and Expression (2).

$$b+d=t \quad (1)$$

$$a-d=t \quad (2)$$

According to Expression (1) and Expression (2), a+b=2t is obtained, and the true delay time t is represented by the following Expression (3). According to Expression (1) and Expression (2), the synchronization error d is represented by the following Expression (4).

$$t=(a+b)/2 \quad (3)$$

$$d=(a-b)/2 \quad (4)$$

The transmission signal is a light signal, and therefore, an inter-vehicle distance L between the vehicle 11 and the vehicle 12 can be obtained by conversion using the following Expression (5). In Expression (5), "c" is the speed of light (299,792,458 [m/s]).

$$L=t \cdot c \quad (5)$$

In this way, by transmitting the apparent delay times (a, b) to each other between the vehicles, the vehicle 11 and the vehicle 12 can calculate the inter-vehicle distance between the vehicle 11 and the vehicle 12. Then, the terminal 10 can calculate the true delay time t according to Expression (1) or Expression (2) by using the calculated synchronization error d and the apparent delay time obtained for each optical communication. The terminal 10 transmits and receives the apparent delay time via the transmission and reception unit 112 using a wireless communication. The terminal 10 transmits the synchronization error via the transmission and reception unit 112 using a wireless communication. The terminal 10 may transmit the apparent delay time and the synchronization error using an optical communication depending on the frequency of the used reference signal. Alternatively, the terminal 10 may transmit the apparent delay time and the synchronization error via the server apparatus 20.

Next, a communication example among three vehicles is described.

Figure 6:
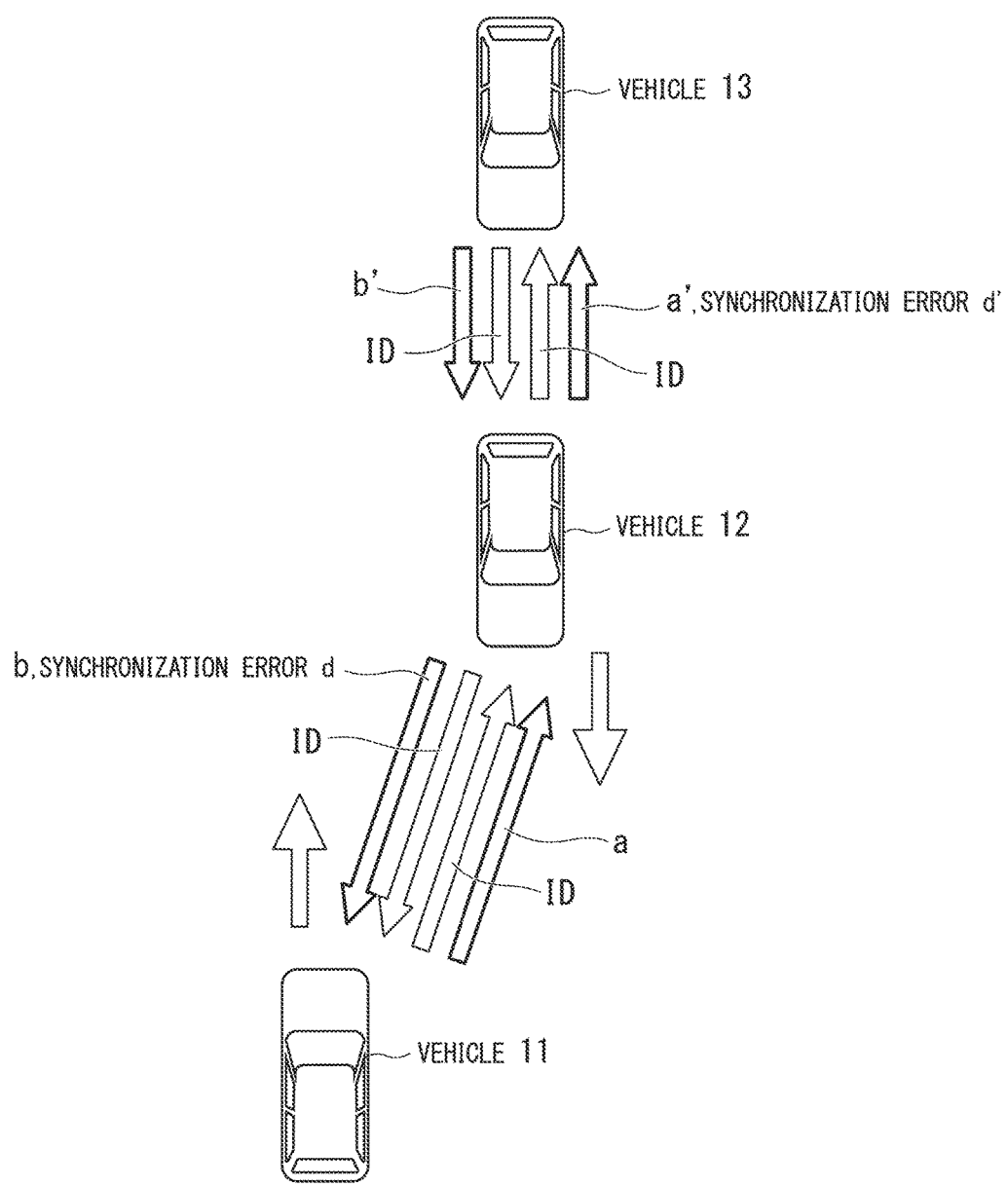
FIG. 6 is a view showing a communication example among three vehicles in a state where two vehicles are capable of optically communicating with each other according to the embodiment.

FIG. 6 is a view showing a communication example among three vehicles in a state where two vehicles are capable of optically communicating with each other according to the present embodiment. In FIG. 6, the vehicle 12 and the vehicle 13 are oncoming vehicles of the vehicle 11 and are traveling in the opposite direction of the travel direction of the vehicle 11. In the example, the vehicle 12 and the vehicle 13 are traveling in front of the vehicle 11, and the vehicle 13 is traveling in the rear of the vehicle 12.

In the example shown in FIG. 6, the vehicle 11 and the vehicle 12 are positioned at a distance in which the vehicle 11 and the vehicle 12 can perform a mutual optical communication, and the vehicle 12 and the vehicle 13 are positioned at a distance in which the vehicle 12 and the vehicle 13 can perform a mutual optical communication. The vehicle 11 and the vehicle 13 are positioned at a distance in which the vehicle 11 and the vehicle 13 cannot perform a mutual optical communication.

As shown in FIG. 6, the vehicle 11 and the vehicle 12 mutually transmit and receive the ID using an optical communication. Then, the terminal 10 of the vehicle 11 calculates the apparent delay time a between the vehicle 11 and the vehicle 12 in the vehicle 11 and transmits the calculated apparent delay time a in the vehicle 11 to the vehicle 12 using a wireless communication. The terminal 10 of the vehicle 12 calculates the apparent delay time b between the vehicle 11 and the vehicle 12 in the vehicle 12 and transmits the calculated apparent delay time b in the vehicle 12 to the vehicle 11 using a wireless communication. Then, the terminals 10 of the vehicle 11 and the vehicle 12 calculate the synchronization error d between the vehicle 11 and the vehicle 12 by using the apparent delay time a and the apparent delay time b and transmit the calculated synchronization error d between the vehicle 11 and the vehicle 12 together with the ID of the terminal 10 to the server apparatus 20 using a wireless communication.

The vehicle 12 and the vehicle 13 mutually transmit and receive the ID using an optical communication. Then, the terminal 10 of the vehicle 12 calculates the apparent delay time a' between the vehicle 12 and the vehicle 13 in the vehicle 12 and transmits the calculated apparent delay time a' in the vehicle 12 to the vehicle 13 using a wireless communication. The terminal 10 of the vehicle 13 calculates the apparent delay time b' between the vehicle 12 and the vehicle 13 in the vehicle 13 and transmits the calculated apparent delay time b' in the vehicle 13 to the vehicle 12 using a wireless communication. Then, the terminals 10 of the vehicle 12 and the vehicle 13 calculate the synchronization error d' between the vehicle 12 and the vehicle 13 by using the apparent delay time a' and the apparent delay time b' and transmit the calculated synchronization error d' between the vehicle 12 and the vehicle 13 together with the ID of the terminal 10 to the server apparatus 20 using a wireless communication.

The terminal 10 of the vehicle 12 transmits the synchronization error d between the vehicle 11 and the vehicle 12 to the vehicle 13 using a wireless communication. The terminal 10 of the vehicle 12 transmits the synchronization error d' between the vehicle 12 and the vehicle 13 to the vehicle 11 using a wireless communication.

When the vehicle 11 and the vehicle 13 are present at a distance in which the vehicle 11 and the vehicle 13 cannot optically communicate directly with each other, the terminal 10 of the vehicle 11 receives the synchronization error d' between the vehicle 12 and the vehicle 13 from the vehicle 12. The terminal 10 of the vehicle 11 stores the calculated synchronization error d between the vehicle 11 and the vehicle 12 and the received synchronization error d' between the vehicle 12 and the vehicle 13 in the storage unit 111.

When the vehicle 11 and the vehicle 13 are present at a distance in which the vehicle 11 and the vehicle 13 cannot optically communicate directly with each other, the terminal 10 of the vehicle 13 receives the synchronization error d between the vehicle 11 and the vehicle 12 from the vehicle 12. The terminal 10 of the vehicle 13 stores the received synchronization error d between the vehicle 11 and the vehicle 12 and the calculated synchronization error d' between the vehicle 12 and the vehicle 13 in the storage unit 111.

Next, a communication example when the three vehicles shown in FIG. 6 move forward is described.

Figure 7:
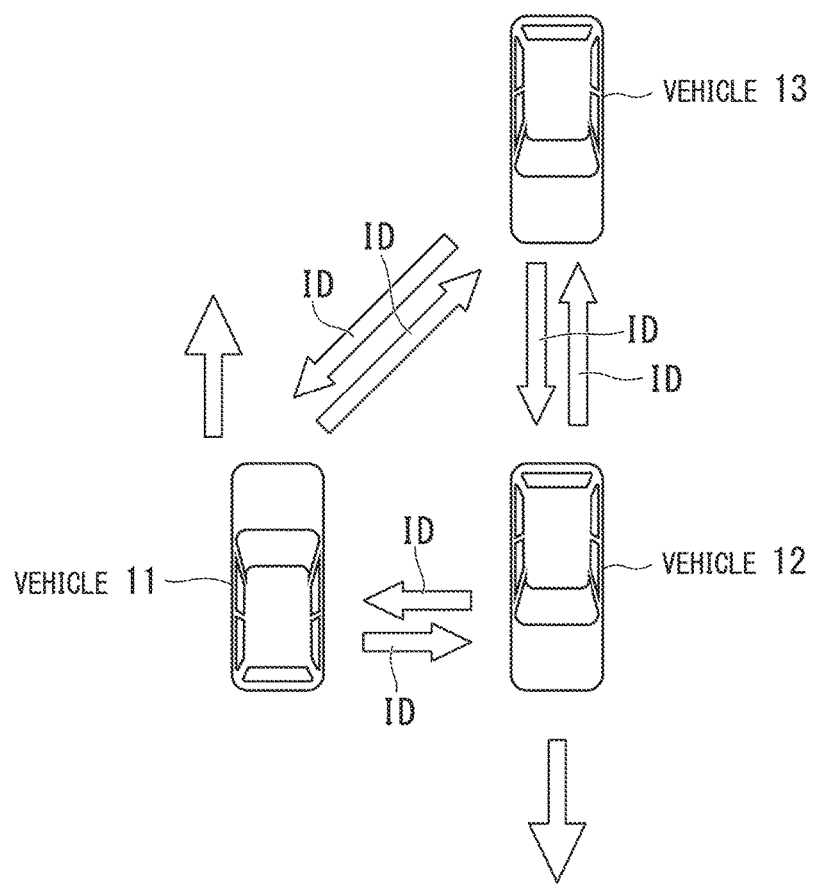
FIG. 7 is a view showing a communication example among three vehicles in a state where the three vehicles are capable of optically communicating with one another according to the embodiment.

FIG. 7 is a view showing a communication example among three vehicles in a state where the three vehicles are capable of optically communicating with one another according to the present embodiment. In the example shown in FIG. 7, the vehicle 11, the vehicle 12, and the vehicle 13 are positioned at a distance in which the vehicle 11, the vehicle 12, and the vehicle 13 can perform a mutual optical communication. In the state of the drawing shown in FIG. 7, the vehicle 11 has already performed an optical communication with the vehicle 12, acquired the mutual apparent delay times (a, b), and received the synchronization error d' between the vehicle 12 and the vehicle 13 from the vehicle 12. In the state of the drawing shown in FIG. 7, the vehicle 13 has already performed an optical communication with the vehicle 12, acquired the mutual apparent delay times (a', b'), and received the synchronization error d between the vehicle 11 and the vehicle 12 from the vehicle 12.

Each of the terminals 10 of the vehicle 11 and the vehicle 13 calculates a synchronization error d" between the vehicle 11 and the vehicle 13 by calculating the sum of the synchronization error d and the synchronization error d' stored by the storage unit 111 using the following Expression (6).

$$d''=d+d' \quad (6)$$

When the vehicle 11 and the vehicle 13 reach a range in which the vehicle 11 and the vehicle 13 are capable of optically communicating directly with each other, the terminal 10 of the vehicle 11 receives a transmission signal transmitted by the vehicle 13 while transmitting a transmission signal to the vehicle 13 using an optical communication. The transmission signal includes an ID, a time code, and a synchronization class.

The terminal 10 of the vehicle 11 calculates an apparent delay time a" between the vehicle 11 and the vehicle 13 in the vehicle 11 based on the transmission and reception of the transmission signal. The terminal 10 of the vehicle 11 calculates the true delay time t by subtracting the synchronization error d" from the apparent delay time a" using the following Expression (7).

$$t=a''-d'' \quad (7)$$

Thereby, the terminal 10 of the vehicle 11 can obtain the inter-vehicle distance between the vehicle 11 and the vehicle 13 by converting the obtained true delay time t into the distance without receiving an apparent delay time b" between the vehicle 11 and the vehicle 13 in the vehicle 13 from the vehicle 13.

The terminal 10 of the vehicle 13 calculates the apparent delay time b" between the vehicle 11 and the vehicle 13 in the vehicle 13 based on the transmission and reception of the transmission signal. The terminal 10 of the vehicle 13 calculates the true delay time t by adding the synchronization error d" to the apparent delay time b" using the following Expression (8).

$$t=b''+d'' \quad (8)$$

Thereby, the terminal 10 of the vehicle 13 can obtain the inter-vehicle distance between the vehicle 11 and the vehicle 13 by converting the obtained true delay time t into the distance without receiving the apparent delay time a" between the vehicle 11 and the vehicle 13 in the vehicle 11 from the vehicle 11.

In this way, according to the present embodiment, when the vehicle 11 and the vehicle 13 reach a range in which the vehicle 11 and the vehicle 13 are capable of optically communicating directly with each other, the vehicle 11 and the vehicle 13 can obtain the inter-vehicle distance with each other according to the process in which the ID is transmitted and received using an optical communication.

As described above, in the present embodiment, the vehicle 12 communicates with the vehicle 11 and the vehicle 13. The vehicle 12 transmits the synchronization error d between the vehicle 11 and the vehicle 12 to the vehicle 13 according to a wireless communication and transmits the synchronization error d' between the vehicle 12 and the vehicle 13 to the vehicle 11 according to a wireless communication. When each of the vehicle 11 to the vehicle 13 moves forward and the vehicle 11 and the vehicle 13 reach a range in which the vehicle 11 and the vehicle 13 are capable of communicating with each other, the vehicle 11 and the vehicle 13 have already acquired the synchronization error with each other and therefore can calculate the apparent delay time when the ID is mutually transmitted and received to calculate the inter-vehicle distance between the vehicle 11 and the vehicle 13 by using the calculated apparent delay time and the acquired synchronization error. Thereby, according to the present embodiment, even when the distance between the vehicles is a distance in which the vehicles cannot communicate directly with each other, it is possible to measure the distance by sharing information (synchronization error or the like) via a vehicle that is present at a communicable distance.

Next, an example of a measurement sequence of the inter-vehicle distances among the three vehicles 11 to 13 shown in FIG. 6 is described.

Figure 8:
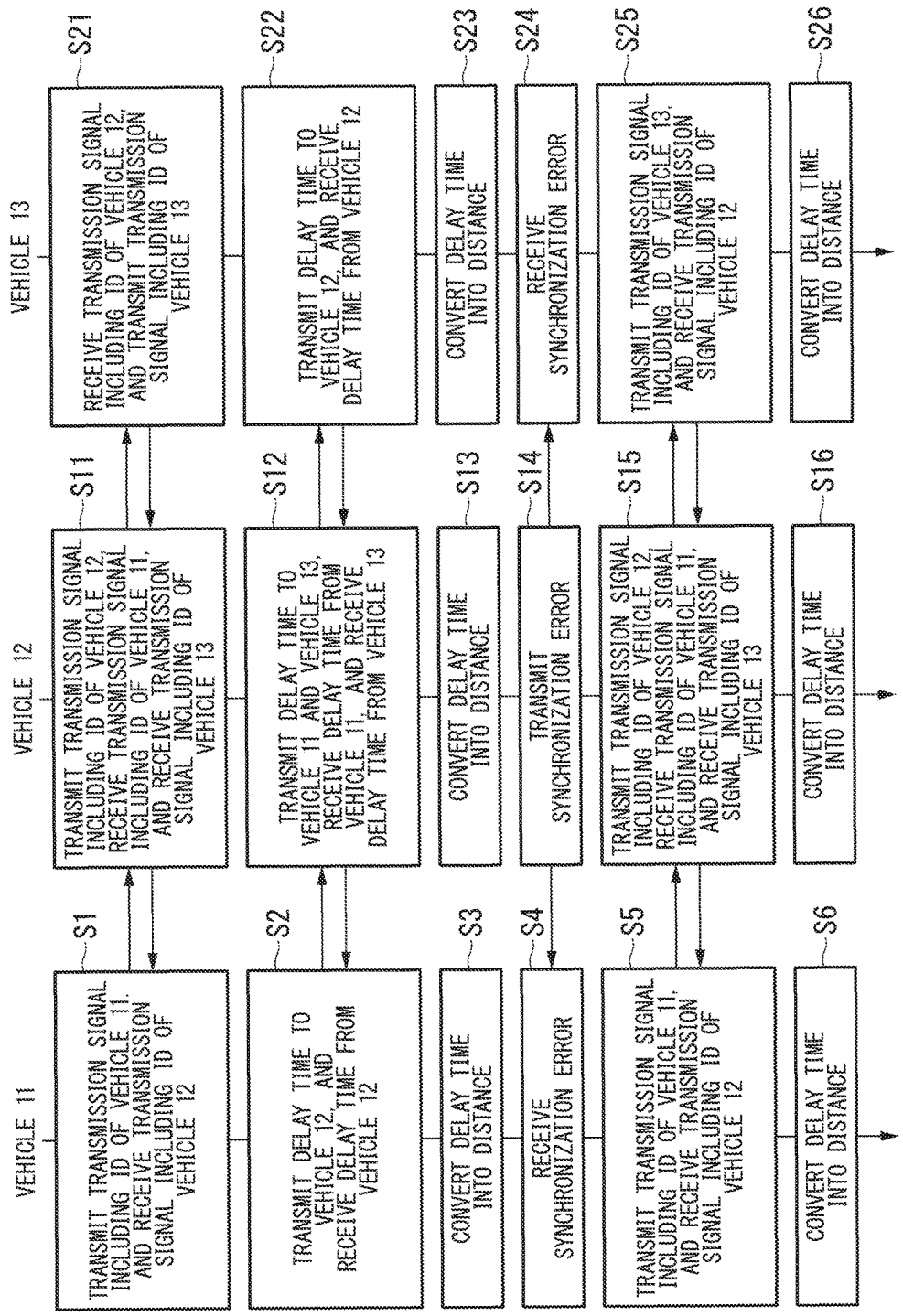
FIG. 8 is a sequence diagram in which each of three vehicles in a state where two vehicles are capable of optically communicating with each other measures the inter-vehicle distance according to the embodiment.

FIG. 8 is a sequence diagram in which each of the three vehicles 11 to 13 in a state where two vehicles are capable of optically communicating with each other measures the inter-vehicle distance according to the present embodiment. The terminal 10 shown in FIG. 1 is provided on each of the vehicles 11 to 13. In the following description, the terminal 10 provided on the vehicle 11 is referred to as a terminal $10_{ii}$, the terminal 10 provided on the vehicle 12 is referred to as a terminal $10_{12}$, and the terminal 10 provided on the vehicle 13 is referred to as a terminal $10_{13}$. The ID may be allocated to the terminal 10 or may be allocated to the vehicle. As described using FIG. 4, the terminal 10 performs transmission and reception simultaneously for each one frame.

First, a measurement sequence of the terminal $10_{11}$ provided on the vehicle 11 is described.

(Step S1) The control unit 107 of the terminal $10_{11}$ receives a transmission signal transmitted by the terminal $10_{12}$ according to an optical communication while transmitting a transmission signal to the vehicle 12 according to an optical communication. The transmission signal includes an ID, a time code, and a synchronization class indicating synchronization accuracy. Subsequently, the control unit 107 of the terminal $10_{11}$ stores a transmission time, a reception time, the ID, the synchronization class, and the received time code in the storage unit 111.

(Step S2) The control unit 107 of the terminal $10_{11}$ calculates an apparent delay time between the vehicle 11 and the vehicle 12 in the vehicle 11 from a difference between the timing of transmission to the vehicle 12 and the timing of reception from the vehicle 12. Subsequently, the control unit 107 of the terminal $10_{11}$ stores, in the storage unit 111, the apparent delay time between the vehicle 11 and the vehicle 12 in the vehicle 11 which is calculated. Subsequently, the terminal $10_{11}$ receives, according to a wireless communication, the apparent delay time between the vehicle 11 and the vehicle 12 in the vehicle 12 and the time code of the vehicle 12 which are transmitted by the terminal $10_{12}$ while transmitting, according to a wireless communication, the apparent delay time between the vehicle 11 and the vehicle 12 in the vehicle 11 which is calculated and the time code of the vehicle 11 to the terminal $10_{12}$. Subsequently, the control unit 107 of the terminal $10_{11}$ stores, in the storage unit 111, the apparent delay time between the vehicle 11 and the vehicle 12 in the vehicle 12 which is received in an associated manner.

(Step S3) The control unit 107 of the terminal $10_{11}$ calculates, according to Expression (3), the true delay time between the vehicle 11 and the vehicle 12 by using the apparent delay time between the vehicle 11 and the vehicle 12 in the vehicle 11 which is calculated and the apparent delay time between the vehicle 11 and the vehicle 12 in the vehicle 12 which is received in Step S2 and is associated according to the time code. Subsequently, the control unit 107 of the terminal $10_{11}$ converts, according to Expression (5), the calculated true delay time between the vehicle 11 and the vehicle 12 into the inter-vehicle distance between the vehicle 11 and the vehicle 12. The control unit 107 of the terminal $10_{11}$ may store, in the storage unit 111, the calculated true delay time in association with the ID of the vehicle 11 and the ID of the vehicle 12.

(Step S4) The control unit 107 of the terminal $10_{11}$ calculates the synchronization error between the vehicle 11 and the vehicle 12 by using the apparent delay time between the vehicle 11 and the vehicle 12 in the vehicle 11 and the apparent delay time between the vehicle 11 and the vehicle 12 in the vehicle 12 which is associated according to the time code. Subsequently, the control unit 107 of the terminal $10_{11}$ stores, in the storage unit 111, the synchronization error between the vehicle 11 and the vehicle 12 which is calculated. Subsequently, the control unit 107 of the terminal $10_{11}$ receives the synchronization error between the vehicle 12 and the vehicle 13 which is transmitted by the terminal $10_{12}$ according to a wireless communication. Subsequently, the control unit 107 of the terminal $10_{11}$ stores, in the storage unit 111, the synchronization error between the vehicle 12 and the vehicle 13 which is received.

(Step S5) The control unit 107 of the terminal $10_{11}$ receives a transmission signal including the ID of the vehicle 12 which is transmitted by the terminal $10_{12}$ while transmitting a transmission signal including the ID of the vehicle 11 to the vehicle 12 according to an optical communication.

(Step S6) The control unit 107 of the terminal $10_{11}$ calculates the apparent delay time between the vehicle 11 and the vehicle 12 in the vehicle 11 when receiving the transmission signal which includes the ID and is transmitted by the terminal $10_{12}$. Subsequently, the control unit 107 of the terminal $10_{11}$ calculates the true delay time between the vehicle 11 and the vehicle 12 according to Expression (1) or Expression (2) by using the synchronization error between the vehicle 11 and the vehicle 12 which is stored by the storage unit 111 and the apparent delay time between the vehicle 11 and the vehicle 12 in the vehicle 11 which is calculated. Subsequently, the control unit 107 of the terminal $10_{11}$ converts the calculated true delay time into the inter-vehicle distance between the vehicle 11 and the vehicle 12.

Next, a measurement sequence of the terminal $10_{12}$ provided on the vehicle 12 is described. The terminal $10_{12}$ performs an optical communication with the terminal $10_{13}$ provided on the vehicle 13 by using the lens 101, the light reception unit 102, and the projector 110 attached at the rear with respect to the travel direction of the vehicle. The terminal $10_{12}$ performs an optical communication with the terminal $10_{11}$ provided on the vehicle 11 by using the lens 101, the light reception unit 102, and the projector 110 attached at the front with respect to the travel direction of the vehicle.

(Step S11) The control unit 107 of the terminal $10_{12}$ receives a transmission signal including the ID of the vehicle 13 and transmitted by the terminal $10_{13}$ while transmitting a transmission signal including the ID of the vehicle 12 to the vehicle 11 and the vehicle 12 according to an optical communication and while receiving a transmission signal including the ID of the vehicle 11 transmitted by the terminal $10_{11}$ according to an optical communication. Subsequently, the control unit 107 of the terminal $10_{12}$ stores a transmission time, a reception time, the ID, the synchronization class, and the received time code in the storage unit 111.

(Step S12) The control unit 107 of the terminal $10_{12}$ calculates an apparent delay time between the vehicle 11 and the vehicle 12 in the vehicle 12 from a difference between the timing of transmission to the vehicle 11 and the timing of reception from the vehicle 11. Subsequently, the control unit 107 of the terminal $10_{12}$ stores, in the storage unit 111, the apparent delay time between the vehicle 11 and the vehicle 12 in the vehicle 12. Subsequently, the control unit 107 of the terminal $10_{12}$ calculates an apparent delay time between the vehicle 12 and the vehicle 13 in the vehicle 12 from a difference between the timing of transmission to the vehicle 13 and the timing of reception from the vehicle 13.

Subsequently, the control unit 107 of the terminal $10_{12}$ stores, in the storage unit 111, the apparent delay time between the vehicle 12 and the vehicle 13 in the vehicle 12. Subsequently, the terminal $10_{12}$ receives, according to a wireless communication, the apparent delay time in the vehicle 13 which is transmitted by the terminal $10_{13}$ while transmitting, according to a wireless communication, the apparent delay time in the vehicle 12 which is calculated and the time code of the vehicle 12 to the terminal $10_{11}$ and the terminal $10_{13}$ and while receiving, according to a wireless communication, the apparent delay time in the vehicle 11 and the time code of the vehicle 11 which are transmitted by the terminal $10_{11}$. Subsequently, the control unit 107 of the terminal $10_{12}$ stores, in the storage unit 111, the apparent delay time in the vehicle 11 in association with the ID of the vehicle 11 and stores, in the storage unit 111, the apparent delay time in the vehicle 13 in association with the ID of the vehicle 13.

(Step S13) The control unit 107 of the terminal $10_{12}$ calculates, according to Expression (3), the true delay time between the vehicle 11 and the vehicle 12 by using the apparent delay time between the vehicle 11 and the vehicle 12 in the vehicle 12 which is calculated and the apparent delay time between the vehicle 11 and the vehicle 12 in the vehicle 11 which is received in Step S12 and is associated according to the time code. Subsequently, the control unit 107 of the terminal $10_{12}$ converts, according to Expression (5), the true delay time between the vehicle 11 and the vehicle 12 into the inter-vehicle distance between the vehicle 11 and the vehicle 12. Subsequently, the control unit 107 of the terminal $10_{12}$ calculates, according to Expression (3), the true delay time between the vehicle 12 and the vehicle 13 by using the apparent delay time between the vehicle 12 and the vehicle 13 in the vehicle 12 and the apparent delay time between the vehicle 12 and the vehicle 13 in the vehicle 13 which is received in Step S12. Subsequently, the control unit 107 of the terminal $10_{12}$ converts, according to Expression (5), the true delay time between the vehicle 12 and the vehicle 13 into the inter-vehicle distance between the vehicle 12 and the vehicle 13.

(Step S14) The control unit 107 of the terminal $10_{12}$ calculates the synchronization error between the vehicle 11 and the vehicle 12 by using the apparent delay time between the vehicle 11 and the vehicle 12 in the vehicle 11 and the apparent delay time between the vehicle 11 and the vehicle 12 in the vehicle 12 which is associated according to the time code. Subsequently, the control unit 107 of the terminal $10_{12}$ stores, in the storage unit 111, the synchronization error between the vehicle 11 and the vehicle 12 which is calculated. Subsequently, the control unit 107 of the terminal $10_{12}$ calculates the synchronization error between the vehicle 12 and the vehicle 13 by using the apparent delay time between the vehicle 12 and the vehicle 13 in the vehicle 12 and the apparent delay time between the vehicle 12 and the vehicle 13 in the vehicle 13 which is associated according to the time code. Subsequently, the control unit 107 of the terminal $10_{12}$ stores, in the storage unit 111, the synchronization error between the vehicle 12 and the vehicle 13 which is calculated. Subsequently, the control unit 107 of the terminal $10_{12}$ transmits the synchronization error between the vehicle 12 and the vehicle 13 to the terminal $10_{11}$ according to a wireless communication while transmitting the synchronization error between the vehicle 11 and the vehicle 12 to the terminal $10_{13}$ according to a wireless communication (Step S15) The control unit 107 of the terminal $10_{12}$ receives a transmission signal including the ID of the vehicle 13 which is transmitted by the terminal $10_{13}$ while transmitting a transmission signal including the ID of the vehicle 12 to the terminal $10_{11}$ and the terminal $10_{13}$ according to an optical communication and while receiving a transmission signal including the ID of the vehicle 11 transmitted by the terminal $10_{11}$ according to an optical communication.

(Step S16) The control unit 107 of the terminal $10_{12}$ calculates the apparent delay time between the vehicle 11 and the vehicle 12 in the vehicle 12 when receiving the transmission signal which is transmitted by the terminal $10_{11}$.

Subsequently, the control unit 107 of the terminal $10_{11}$ calculates the true delay time between the vehicle 11 and the vehicle 12 according to Expression (1) or Expression (2) by using the synchronization error between the vehicle 11 and the vehicle 12 which is stored by the storage unit 111 and the apparent delay time between the vehicle 11 and the vehicle 12 in the vehicle 11 which is calculated. Subsequently, the terminal $10_{12}$ converts the true delay time which is calculated into the inter-vehicle distance between the vehicle 11 and the vehicle 12. Subsequently, the control unit 107 of the terminal $10_{12}$ calculates the apparent delay time between the vehicle 12 and the vehicle 13 in the vehicle 12 when receiving the transmission signal which is transmitted by the terminal $10_{13}$. Subsequently, the control unit 107 of the terminal $10_{12}$ calculates the true delay time between the vehicle 12 and the vehicle 13 according to Expression (1) or Expression (2) by using the synchronization error between the vehicle 12 and the vehicle 13 which is stored by the storage unit 111 and the apparent delay time between the vehicle 12 and the vehicle 13 in the vehicle 12 which is calculated. Subsequently, the terminal $10_{12}$ converts the true delay time which is calculated into the inter-vehicle distance between the vehicle 12 and the vehicle 13.

Next, a measurement sequence of the terminal $10_{13}$ provided on the vehicle 13 is described.

(Step S21) The control unit 107 of the terminal $10_{13}$ transmits a transmission signal including the ID of the vehicle 13 to the terminal $10_{12}$ according to an optical communication. Subsequently, the terminal $10_{13}$ receives a transmission signal including the ID of the vehicle 12 according to an optical communication. Subsequently, the control unit 107 of the terminal $10_{13}$ stores a transmission time, a reception time, the ID, the synchronization class, and the received time code in the storage unit 111.

(Step S22) The control unit 107 of the terminal $10_{12}$ calculates an apparent delay time between the vehicle 12 and the vehicle 13 in the vehicle 13 from a difference between the timing of transmission to the vehicle 12 and the timing of reception from the vehicle 12. Subsequently, the control unit 107 of the terminal $10_{13}$ stores, in the storage unit 111, the apparent delay time between the vehicle 12 and the vehicle 13 in the vehicle 13. Subsequently, the control unit 107 of the terminal $10_{13}$ transmits, according to a wireless communication, the apparent delay time between the vehicle 12 and the vehicle 13 in the vehicle 13 which is calculated to the vehicle 12. Subsequently, the control unit 107 of the terminal $10_{13}$ receives, according to a wireless communication, the apparent delay time between the vehicle 12 and the vehicle 13 in the vehicle 12 which is transmitted by the terminal $10_{12}$. Subsequently, the control unit 107 of the terminal $10_{13}$ stores, in the storage unit 111, the apparent delay time between the vehicle 12 and the vehicle 13 in the vehicle 12.

(Step S23) The control unit 107 of the terminal $10_{13}$ calculates, according to Expression (3), the true delay time between the vehicle 12 and the vehicle 13 by using the apparent delay time between the vehicle 12 and the vehicle 13 in the vehicle 13 which is calculated and the apparent delay time between the vehicle 12 and the vehicle 13 in the vehicle 12 which is received in Step S22 and is associated according to the time code. Subsequently, the control unit 107 of the terminal $10_{13}$ converts, according to Expression (5), the true delay time between the vehicle 12 and the vehicle 13 which is calculated into the inter-vehicle distance between the vehicle 12 and the vehicle 13.

(Step S24) The control unit 107 of the terminal $10_{13}$ calculates the synchronization error between the vehicle 12 and the vehicle 13 by using the apparent delay time between the vehicle 12 and the vehicle 13 in the vehicle 12 and the apparent delay time between the vehicle 12 and the vehicle 13 in the vehicle 13 which is associated according to the time code. Subsequently, the control unit 107 of the terminal $10_{13}$ stores, in the storage unit 111, the synchronization error between the vehicle 12 and the vehicle 13 which is calculated. Subsequently, the control unit 107 of the terminal $10_{13}$ receives the synchronization error between the vehicle 11 and the vehicle 12 which is transmitted by the terminal $10_{12}$ according to a wireless communication. Subsequently, the control unit 107 of the terminal $10_{13}$ stores, in the storage unit 111, the synchronization error between the vehicle 11 and the vehicle 12 which is received.

(Step S25) The control unit 107 of the terminal $10_{13}$ receives a transmission signal including the ID of the vehicle 12 which is transmitted by the terminal $10_{12}$ while transmitting a transmission signal including the ID of the vehicle 13 to the vehicle 12 according to an optical communication.

(Step S26) The control unit 107 of the terminal $10_{13}$ calculates the apparent delay time between the vehicle 12 and the vehicle 13 in the vehicle 13 when receiving the transmission signal which includes the ID and is transmitted by the terminal $10_{12}$. Subsequently, the control unit 107 of the terminal $10_{13}$ calculates the true delay time between the vehicle 12 and the vehicle 13 according to Expression (1) or Expression (2) by using the synchronization error between the vehicle 12 and the vehicle 13 which is stored by the storage unit 111 and the apparent delay time between the vehicle 12 and the vehicle 13 in the vehicle 13 which is calculated. Subsequently, the control unit 107 of the terminal $10_{13}$ converts the calculated true delay time into the inter-vehicle distance between the vehicle 12 and the vehicle 13.

As shown in FIG. 7, in the present embodiment, first, the terminal 10 transmits the ID of a first vehicle (for example, vehicle 11) to a second vehicle (for example, vehicle 12) according to an optical communication and receives the ID from the second vehicle (for example, vehicle 12) according to an optical communication. Then, the terminal 10 calculates an apparent delay time with respect to the first vehicle and transmits the calculated apparent delay time with respect to the first vehicle to the second vehicle (for example, vehicle 12) according to a wireless communication. Each terminal 10 of the first vehicle and the second vehicle calculates the synchronization error between the first vehicle and the second vehicle. After receiving the apparent delay time, the terminals 10 mutually transmit and receive the ID to thereby calculate the apparent delay time again and can obtain the true delay time between the first vehicle and the second vehicle by using the calculated apparent delay time and the synchronization error between the first vehicle and the second vehicle. Then, the terminal 10 converts the calculated true delay time into a distance and thereby can obtain the inter-vehicle distance between the first vehicle and the second vehicle.

Next, an example of a measurement sequence of the inter-vehicle distances among the three vehicles 11 to 13 shown in FIG. 7 is described.

Figures 9, 10:
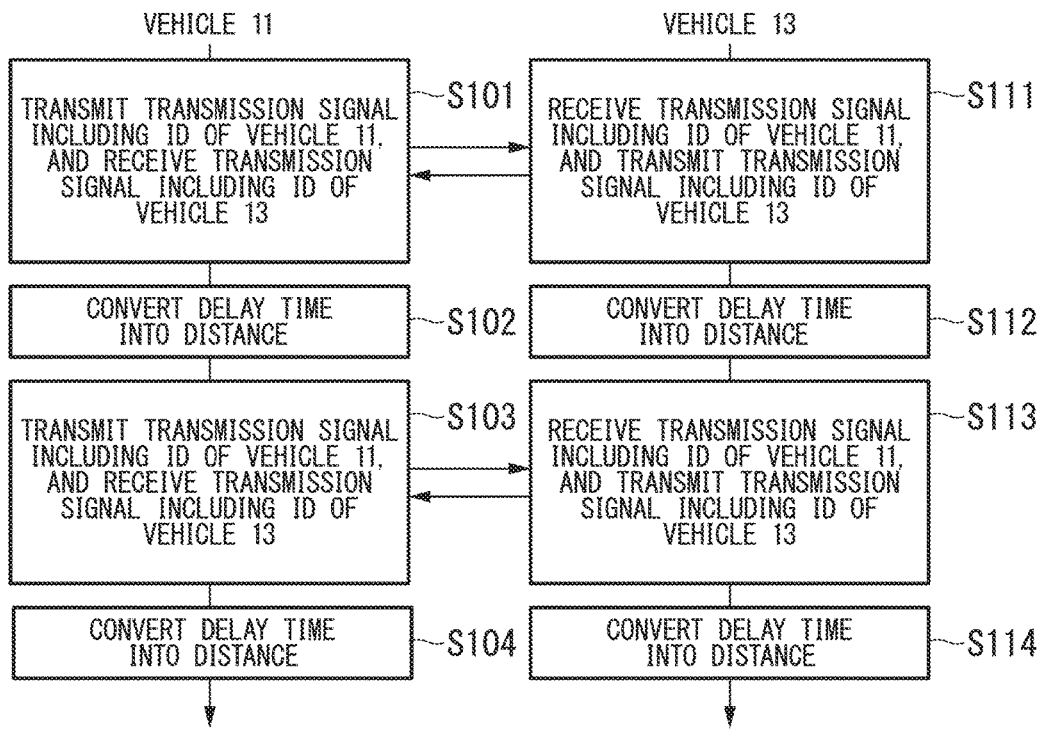
FIG. 9 is a sequence diagram in which two vehicles (a first vehicle and a third vehicle) in a state where three vehicles are capable of optically communicating with one another measure the inter-vehicle distance according to the embodiment.
FIG. 10 is a view showing an example of a synchronization class and a period according to the embodiment.

FIG. 9 is a sequence diagram in which two vehicles 11 and 13 in a state where three vehicles are capable of optically communicating with one another measure the inter-vehicle distance according to the present embodiment. The terminal 10 shown in FIG. 1 is provided on each of the vehicles 11 and 13. In the process shown in FIG. 9, the vehicle 11 has already performed a wireless communication with the vehicle 12, received the mutual apparent delay times (a, b), and received the synchronization error d' between the vehicle 12 and the vehicle 13 from the vehicle 12. In the process shown in FIG. 9, the vehicle 13 has already performed a wireless communication with the vehicle 12, received the mutual apparent delay times (a', b'), and received the synchronization error d between the vehicle 11 and the vehicle 12 from the vehicle 12.

First, a measurement sequence of the terminal $10_{11}$ provided on the vehicle 11 is described.

(Step S101) The terminal $10_{11}$ provided on the vehicle 11 calculates the synchronization error d" between the vehicle 11 and the vehicle 13 by using the synchronization error d between the vehicle 11 and the vehicle 12 and the synchronization error d' between the vehicle 12 and the vehicle 13 and stores the calculated synchronization error d" between the vehicle 11 and the vehicle 13 in the storage unit 111. Subsequently, the control unit 107 of the terminal $10_{11}$ receives a transmission signal including the ID of the vehicle 13 which is transmitted by the terminal $10_{13}$ while transmitting a transmission signal including the ID of the vehicle 11 to the vehicle 13 according to an optical communication.

(Step S102) The control unit 107 of the terminal $10_{11}$ calculates the apparent delay time between the vehicle 11 and the vehicle 13 in the vehicle 11 when receiving the transmission signal including the ID which is transmitted by the terminal $10_{13}$. Subsequently, the control unit 107 of the terminal $10_{11}$ calculates the true delay time between the vehicle 11 and the vehicle 13 according to Expression (7) or Expression (8) by using the synchronization error between the vehicle 11 and the vehicle 13 which is stored by the storage unit 111 and the apparent delay time between the vehicle 11 and the vehicle 12 in the vehicle 11 which is calculated. Subsequently, the control unit 107 of the terminal $10_{11}$ converts the calculated true delay time into the inter-vehicle distance between the vehicle 11 and the vehicle 13.

(Steps S103 to S104) The control unit 107 of the terminal $10_{11}$ performs the processes of Steps S103 to S104 for each predetermined period in a similar way to the processes of Steps S101 to S102.

Next, a measurement sequence of the terminal $10_{13}$ provided on the vehicle 13 is described.

(Step S111) The terminal $10_{13}$ provided on the vehicle 13 calculates the synchronization error d" between the vehicle 11 and the vehicle 13 by using the synchronization error d between the vehicle 11 and the vehicle 12 and the synchronization error d' between the vehicle 12 and the vehicle 13 and stores the calculated synchronization error d" between the vehicle 11 and the vehicle 13 in the storage unit 111. Subsequently, the control unit 107 of the terminal $10_{13}$ receives a transmission signal including the ID of the vehicle 11 which is transmitted by the terminal $10_{11}$ while transmitting a transmission signal including the ID of the vehicle 13 to the vehicle 11 according to an optical communication.

(Step S112) The control unit 107 of the terminal $10_{13}$ calculates the apparent delay time between the vehicle 11 and the vehicle 13 in the vehicle 13 when receiving the transmission signal including the ID which is transmitted by the terminal $10_{11}$. Subsequently, the control unit 107 of the terminal $10_{13}$ calculates the true delay time between the vehicle 11 and the vehicle 13 according to Expression (7) or Expression (8) by using the synchronization error between the vehicle 11 and the vehicle 13 which is stored by the storage unit 111 and the apparent delay time between the vehicle 11 and the vehicle 13 in the vehicle 13 which is calculated. Subsequently, the control unit 107 of the terminal $10_{13}$ converts the calculated true delay time into the inter-vehicle distance between the vehicle 11 and the vehicle 13.

(Steps S113 to S114) The control unit 107 of the terminal $10_{13}$ performs the processes of Steps S113 to S114 for each predetermined period in a similar way to the processes of Steps S111 to S112.

As described above, according to the present embodiment, when the vehicle 11 and the vehicle 13 reach a range in which the vehicle 11 and the vehicle 13 are capable of optically communicating with each other, the terminal $10_{11}$ and the terminal $10_{13}$ have already received the synchronization error and therefore can obtain the inter-vehicle distance based on the timing when the transmission signal including the ID is transmitted and received without performing, for example, the processes of Steps S1 to S4 and Steps S21 to S24 of FIG. 8.

Next, an example of a synchronization class and a predetermined period at which the transmission signal is transmitted and received is described.

FIG. 10 is a view showing an example of a synchronization class and a period according to the present embodiment.

In FIG. 10, a synchronization class of zero is, for example, a frequency accuracy of a level synchronized with the GNSS 103. A synchronization class of one is, for example, a frequency accuracy of $10^{-10}$ or less. A synchronization class of two is, for example, a frequency accuracy of more than $10^{-10}$ and $10^{-9}$ or less. A synchronization class of three is, for example, a frequency accuracy of $10^{-6}$ or more.

As shown in FIG. 10, in the case of the synchronization class of zero, the predetermined period is 100 sec when the error range of the inter-vehicle distance is 0.3 m or less, the predetermined period is 300 sec when the error range of the inter-vehicle distance is more than 0.3 m and is 3 m or less, and the predetermined period is 300 sec when the error range of the inter-vehicle distance is more than 3 m and is 30 m or less.

In the case of the synchronization class of one, the predetermined period is 10 sec when the error range of the inter-vehicle distance is 0.3 m or less, the predetermined period is 100 sec when the error range of the inter-vehicle distance is more than 0.3 m and is 3 m or less, and the predetermined period is 300 sec when the error range of the inter-vehicle distance is more than 3 m and is 30 m or less.

In the case of the synchronization class of two, the predetermined period is 1 sec when the error range of the inter-vehicle distance is 0.3 m or less, the predetermined period is 10 sec when the error range of the inter-vehicle distance is more than 0.3 m and is 3 m or less, and the predetermined period is 100 sec when the error range of the inter-vehicle distance is more than 3 m and is 30 m or less.

In the case of the synchronization class of three, the predetermined period is each time when the error range of the inter-vehicle distance is 0.3 m or less, the predetermined period is each time when the error range of the inter-vehicle distance is more than 0.3 m and is 3 m or less, and the predetermined period is each time when the error range of the inter-vehicle distance is more than 3 m and is 30 m or less. Each time is each one frame, and one frame is, for example, 48.384 [ms] as described below.

FIG. 10 represents that, for example, when the synchronization class is one and the error up to 3 m is acceptable, the mutual communication may be performed once per 100 sec.

In the present embodiment, when the synchronization classes of the vehicles are different from each other, the synchronization classes may be matched to a synchronization class having a greater value. For example, when the synchronization class of the terminal $10_{11}$ of the vehicle 11 is zero and the synchronization class of the terminal $10_{12}$ of the vehicle 12 is two, the terminal $10_{11}$ and the terminal $10_{12}$ may perform an optical communication using the predetermined period of the synchronization class of two.

As described above, in the present embodiment, the period at which the transmission signal is transmitted and received is changed in accordance with the accuracy of the reference signal generated by the oscillator 104. Specifically, the control unit 107 of the terminal 10 makes the predetermined period longer as the frequency accuracy becomes higher and makes the predetermined period shorter as the frequency accuracy becomes lower.

The synchronization class, the error range, and the predetermined period shown in FIG. 10 are an example, and the numerical values are not limited thereto.

<Modified Example of Present Embodiment>

The above embodiment is described using an example in which vehicles perform an optical communication with each other; however, the embodiment is not limited thereto. For example, an optical tag transmission device 30 (FIG. 11) which is installed such as a traffic light, a pedestrian walkway, an overpass, and a guardrail may include a functional unit that transmits and receives a transmission signal.

In this case, the optical tag transmission device 30 includes a functional unit included in the first terminal 10-1 or the second terminal 10-2.

The optical tag transmission device 30 transmits the transmission signal according to an optical communication for each predetermined period. The transmission signal includes at least an identifier (ID) by which the optical tag transmission device 30 is identified, a synchronization class, and a time code.

Figure 11:
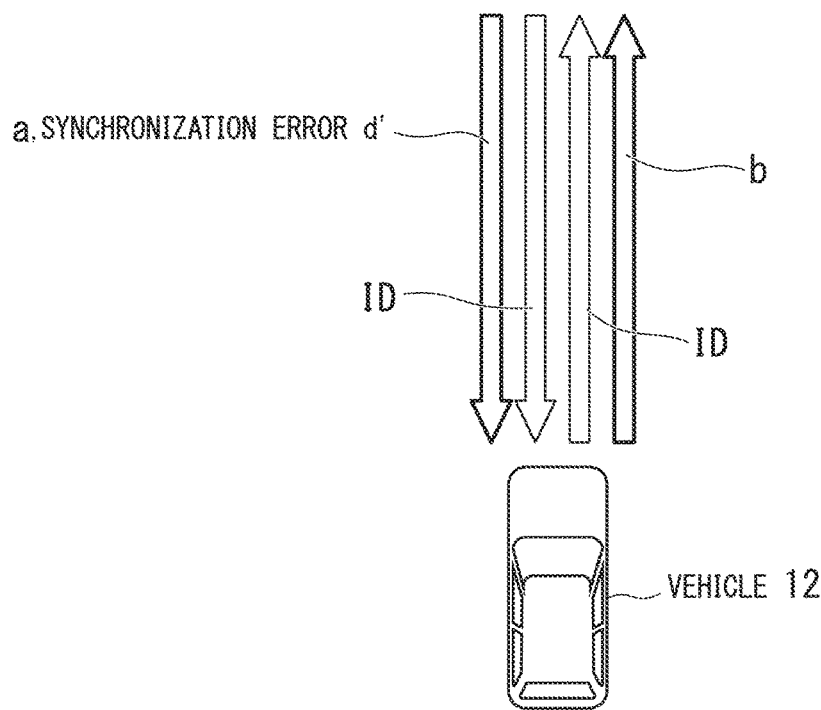
FIG. 11 is a view showing a communication example of an optical tag transmission device, a first vehicle, and a second vehicle according to the embodiment.

FIG. 11 is a view showing a communication example of the optical tag transmission device 30, the vehicle 11, and the vehicle 12 according to the present embodiment. The vehicle 11 and the vehicle 12 are traveling in the same direction, and the vehicle 11 is traveling in front of the vehicle 12. In the example, the optical tag transmission device 30 is present in front of the vehicle 11. The vehicle 11 and the vehicle 12 are traveling in an optically communicable range. The vehicle 11 is traveling in a range in which the vehicle 11 can optically communicate with the optical tag transmission device 30. The vehicle 12 is traveling in a range in which the vehicle 12 cannot optically communicate with the optical tag transmission device 30.

In FIG. 11, the optical tag transmission device 30 receives a transmission signal from the vehicle 11 while transmitting a transmission signal for each predetermined period. The terminal $10_{11}$ of the vehicle 11 receives the transmission signal transmitted by the optical tag transmission device 30. The time when the terminal $10_{11}$ transmits the transmission signal is $t_1$, the time when the optical tag transmission device 30 receives the transmission signal is $t_2$, the time when the optical tag transmission device 30 transmits the transmission signal is $t_3$, and the time when the terminal $10_{11}$ receives the transmission signal is $t_4$.

The control unit 107 of the terminal $10_{11}$ measures an apparent delay time a' between the vehicle 11 and the optical tag transmission device 30 in the vehicle 11 using the reference time of the vehicle 11 and stores the measured apparent delay time a' between the vehicle 11 and the optical tag transmission device 30 in the vehicle 11 in the storage unit 111.

The control unit of the optical tag transmission device 30 measures an apparent delay time b' between the vehicle 11 and the optical tag transmission device 30 in the optical tag transmission device 30 using the reference time of the optical tag transmission device 30 and stores the measured apparent delay time b' between the vehicle 11 and the optical tag transmission device 30 in the optical tag transmission device 30 in the storage unit.

The control unit 107 of the terminal 10$_{11}$ transmits, according to a wireless communication, the apparent delay time a' between the vehicle 11 and the optical tag transmission device 30 in the vehicle 11 to the optical tag transmission device 30.

The control unit of the optical tag transmission device 30 transmits the apparent delay time b' between the vehicle 11 and the optical tag transmission device 30 in the optical tag transmission device 30 to the terminal 10$_{11}$.

The control unit 107 of the terminal 10$_{11}$ calculates a true delay time t' and the synchronization error d' between the optical tag transmission device 30 and the vehicle 11 by using the apparent delay time a' which is stored by the storage unit 111 and the apparent delay time b' which is received.

The control unit 107 of the terminal 10$_{11}$ calculates a distance between the optical tag transmission device 30 and the vehicle 11 by using the true delay time t' between the optical tag transmission device 30 and the vehicle 11 which is calculated.

The control unit 107 of the terminal 10$_{11}$ performs transmission and reception of the transmission signal with the terminal 10$_{12}$ of the vehicle 12.

The control unit 107 of the terminal 10$_{11}$ calculates a synchronization error d between the vehicle 11 and the vehicle 12. The control unit 107 of the terminal 10$_{11}$ transmits the synchronization error d' between the optical tag transmission device 30 and the vehicle 11 which is calculated to the terminal 10$_{12}$ of the vehicle 12 according to a wireless communication.

The terminal 10$_{12}$ of the vehicle 12 receives the synchronization error d' transmitted by the terminal 10$_{11}$ and stores, in the storage unit 111, the synchronization error d and the synchronization error d' which are received. The terminal 10$_{11}$ of the vehicle 11 and the terminal 10$_{12}$ of the vehicle 12 perform an optical communication to thereby calculate the mutual apparent delay time, true delay time, and synchronization error d and share the synchronization error d. The terminal 10$_{12}$ of the vehicle 12 stores the synchronization error d in the storage unit 111.

When the terminal 10$_{12}$ reaches a range in which the terminal 10$_{12}$ can receive a transmission signal transmitted according to an optical communication by the optical tag transmission device 30, the terminal 10$_{12}$ receives the transmission signal transmitted by the optical tag transmission device 30. Subsequently, the terminal 10$_{12}$ measures an apparent delay time b" by using the reference time of the vehicle 12. Subsequently, the terminal 10$_{12}$ calculates a true delay time t" by using the synchronization error d' which is stored by the storage unit 111 and the apparent delay time b" in the vehicle 12 which is calculated. Subsequently, the terminal 10$_{12}$ converts the calculated true delay time t" into a distance L".

As described above, according to the present embodiment, when the terminal 10$_{12}$ of the vehicle 12 is out of a range in which the terminal 10$_{12}$ of the vehicle 12 can perform an optical communication with the optical tag transmission device 30, the terminal 10$_{12}$ of the vehicle 12 receives the synchronization error d' from the terminal 10$_{11}$ of the vehicle 11 traveling in front of the vehicle 12. Thereby, when the terminal 10$_{12}$ reaches a range in which the terminal 10$_{12}$ can receive a transmission signal transmitted by the optical tag transmission device 30, the terminal 10$_{12}$ can calculate the distance between the optical tag transmission device 30 and the vehicle 12 by using the synchronization error d' that has been already received and the apparent delay time b' with the optical tag transmission device 30. Thereby, the terminal 10$_{12}$ can shorten the time according to the calculation of the distance without performing transmission and reception of the apparent delay time or the synchronization error with the optical tag transmission device 30 or the like.

<Transmission Signal>

Next, an example of a transmission signal used by the terminal 10 (including the optical tag transmission device 30) of the present embodiment is described.

Figure 12:
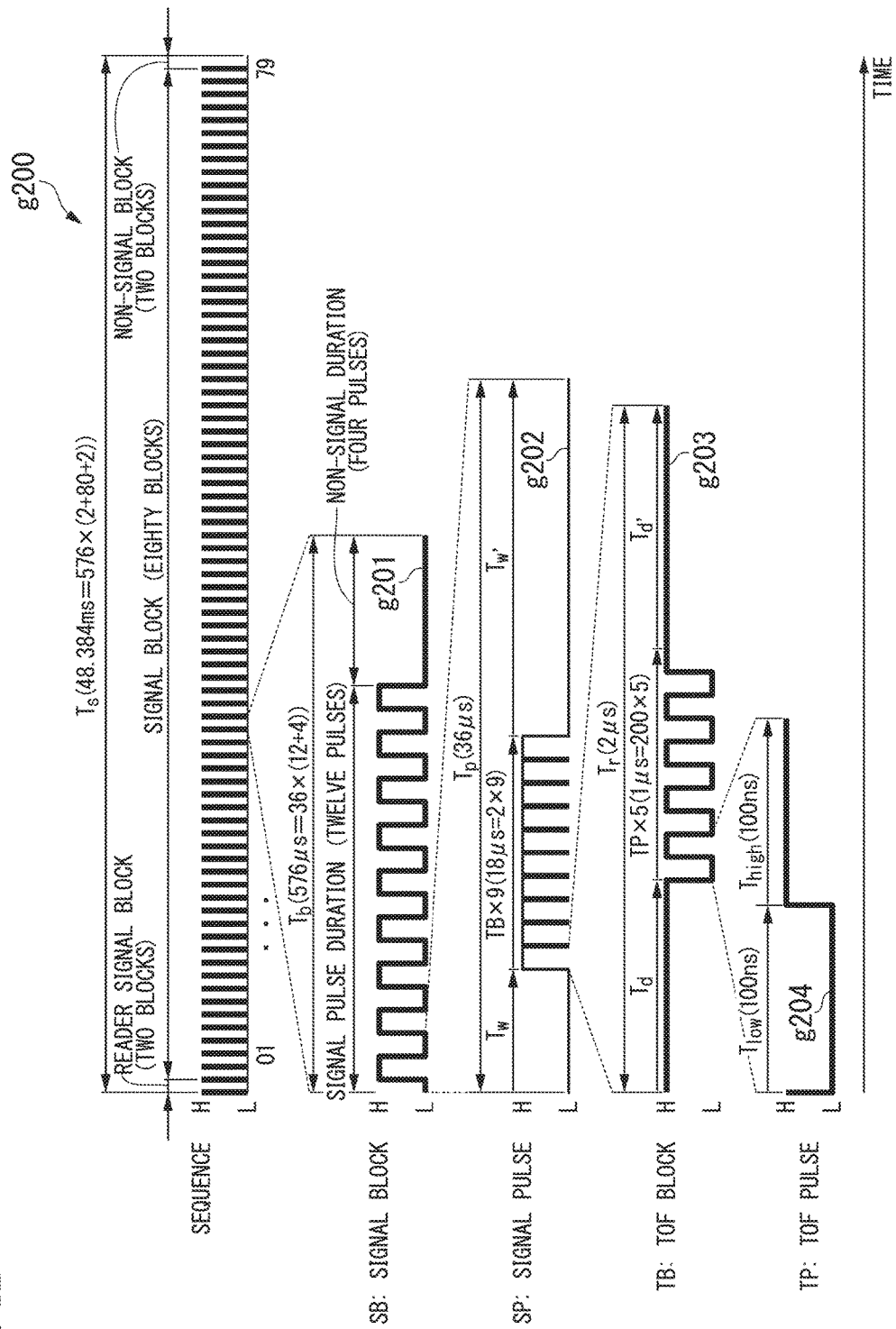
FIG. 12 is a view showing a configuration example of a transmission signal according to the embodiment.

FIG. 12 is a view showing a configuration example of a transmission signal according to the present embodiment. In FIG. 12, the horizontal axis represents time, and the vertical axis represents a H (high) level and a L (low) level of each signal.

As shown in FIG. 12, one sequence of a transmission signal g200 is formed of two reader signal blocks, eighty (n=0 to 79) signal blocks, and two non-signal blocks. One period Ts of one sequence of the transmission signal g200 is 48.384 [msec] (=576 [μsec]×(2+80+2)). A non-signal duration may be provided before and after the sequence in order to make the sequence number per one second an integer.

The reader signal block is a block of a signal that represents the start of a signal block.

The signal block SB is a block of a signal in which transmission information is encoded and modulated.

The non-signal block is a block that represents the end of a signal block and is in a non-signal state.

A waveform g201 is an enlarged waveform of one signal block SB. The one signal block SB is formed of twelve signal pulses and four non-signals. Twelve signal pulses correspond to three ticks. One tick corresponds to four signal pulses.

A duration of a non-signal (also referred to as a non-signal duration) is a duration for four signal pulses. One signal pulse is 36 [μsec]. The non-signal duration is the duration for four signal pulses and therefore corresponds to one tick. Therefore, one period $T_b$ of the signal block is 576 [μsec] (=36 [μsec]×(12+4)). In the g201, the non-signal duration is the L level but may be the H level.

A waveform g202 is an enlarged waveform of one signal pulse SP. The one signal pulse SP is formed of a duration $T_w$ that represents a phase, nine TOF blocks, and a remaining duration $T_{w'}$. The duration of the TOF block TB is 18 [μsec] (=2 [μsec]×9) since the duty is 50%. One period $T_r$ of the TOF block is a duration of (TP×5) (=1 [μsec])×2, that is, 2 [μsec]. The duration $T_w$ that represents a phase is 0 when the phase is 0 degree, is $T_p$×⅓ when the phase is 120 degrees, and is $T_p$×⅔ when the phase is 240 degrees. That is, a bit value is determined depending on the length of the duration $T_w$ that represents a phase.

A waveform g203 is an enlarged waveform of the TOF block TB. The one TOF block TB is formed of a delay duration $T_d$, five TOF pulses, and a remaining duration $T_{d'}$. The delay duration $T_d$ is a predetermined time.

A waveform g204 is an enlarged waveform of the TOF pulse TP. One period of the TOF pulse TP is 200 [nsec], the duration Low of the L level is 100 [nsec], and the duration Tiller of the H level is 100 [nsec].

The relationship among the one period Ts of the sequence, the one period $T_b$ of the signal block SB, the one period $T_p$ of the signal pulse SP, the duration $T_w$ that represents a phase, the remaining duration $T_{w'}$, the one period $T_r$ of the TOF block TB, the delay duration $T_d$, the duration $T_{high}$ of the H level and the duration Low of the L level of the TOF pulse TP, and the remaining duration $T_{d'}$ shown in FIG. 12 is represented by the following Expression (9). The relationship of Expression (9) is determined based on an orthogonality condition.

$$\left.\begin{array}{l} T_s = (2 + 80 + 2)T_b \\ T_b = (12 + 4)T_p \\ T_p = T_w + 9T_r + T_{w'} \\ T_r = T_d + 5(T_{low} + T_{high}) + T_{d'} \end{array}\right\} \quad (9)$$

Next, an operation of the terminal 10 during reception is described.

Figure 13:
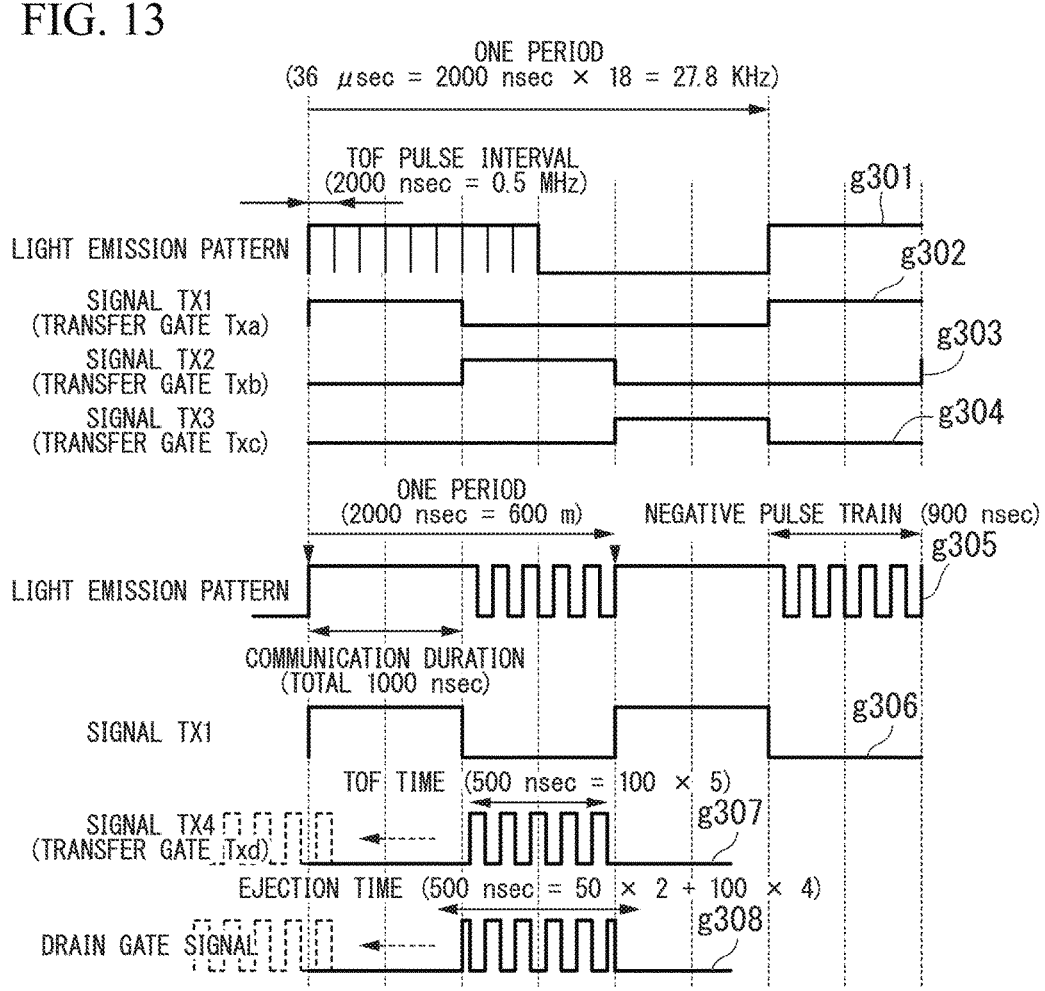
FIG. 13 is a view showing an operation example of a terminal during reception according to the embodiment.

FIG. 13 is a view showing an operation example of the terminal 10 during reception according to the present embodiment. In FIG. 13, the horizontal axis represents time, and the vertical axis represents a H level and a L level of each signal.

A waveform g301 is a waveform example of a light emission pattern of a transmission signal transmitted by another terminal 10. A waveform g302 is a waveform of the signal TX1 for switching between an ON state and an OFF state of the transfer gate Txa. A waveform g303 is a waveform of the signal TX2 for switching between an ON state and an OFF state of the transfer gate Txb. A waveform g304 is a waveform of the signal TX3 for switching between an ON state and an OFF state of the transfer gate Txc.

A waveform g305 is an enlarged waveform of the waveform g301. A waveform g306 is an enlarged waveform of the waveform g302. A waveform g307 is a waveform of the signal TX4 for switching between an ON state and an OFF state of the transfer gate Txd. A waveform g308 is a waveform of the drain gate signal for switching between an ON state and an OFF state of the drain gate Dr.

As shown in the waveform g301, one period of the light emission pattern of the transmission signal is 36 [μs] (=2000 [ns]×18=27.8 [kHz]). The TOF pulse interval is 2000 [ns] (=0.5 [MHz]). As shown in the waveform g305, the one TOF pulse includes a duration in which a H level of 1100 [ns] continues and a duration having a negative pulse train of 900 [ns]. The negative pulse train is a pulse train in which the L level and the H level are alternately repeated as shown in the waveform g305.

As shown by the waveform g306, the signal TX1 includes a H level duration of 1000 [ns] and a L level duration of 1000 [ns]. The duration in which the signal TX1 is a H level includes a duration of 1000 [ns] in which the light emission pattern is a H level. The duration in which the signal TX1 is a L level includes a duration of 900 [ns] in which the light emission pattern is a negative pulse train.

The signal TX4 of the waveform g307 and the drain gate signal move from left to right during time 0 to time 2000 [ns].

As shown in the waveform g307, the signal TX4 includes five H level durations of 100 [ns]. A L level duration of 100 [ns] is included between the H levels. Five H level durations and four L level durations between the H level durations are integrally referred to also as a TOF time. The TOF time is 900 [ns] (=100×(5+4)).

As shown in the waveform g308, the drain gate signal includes a H level duration of 50 [ns] on both sides, four H level durations of 100 [ns], and five L level durations of 100 [ns]. A duration sandwiched by the two H levels of 50 [ns] is also referred to as an ejection time.

The ejection time is 1000 [ns] (=50×2+100×(5+4)).

Next, a waveform example of time 0 to time 2000 [ns] of the signal TX4 is described.

Figure 14:
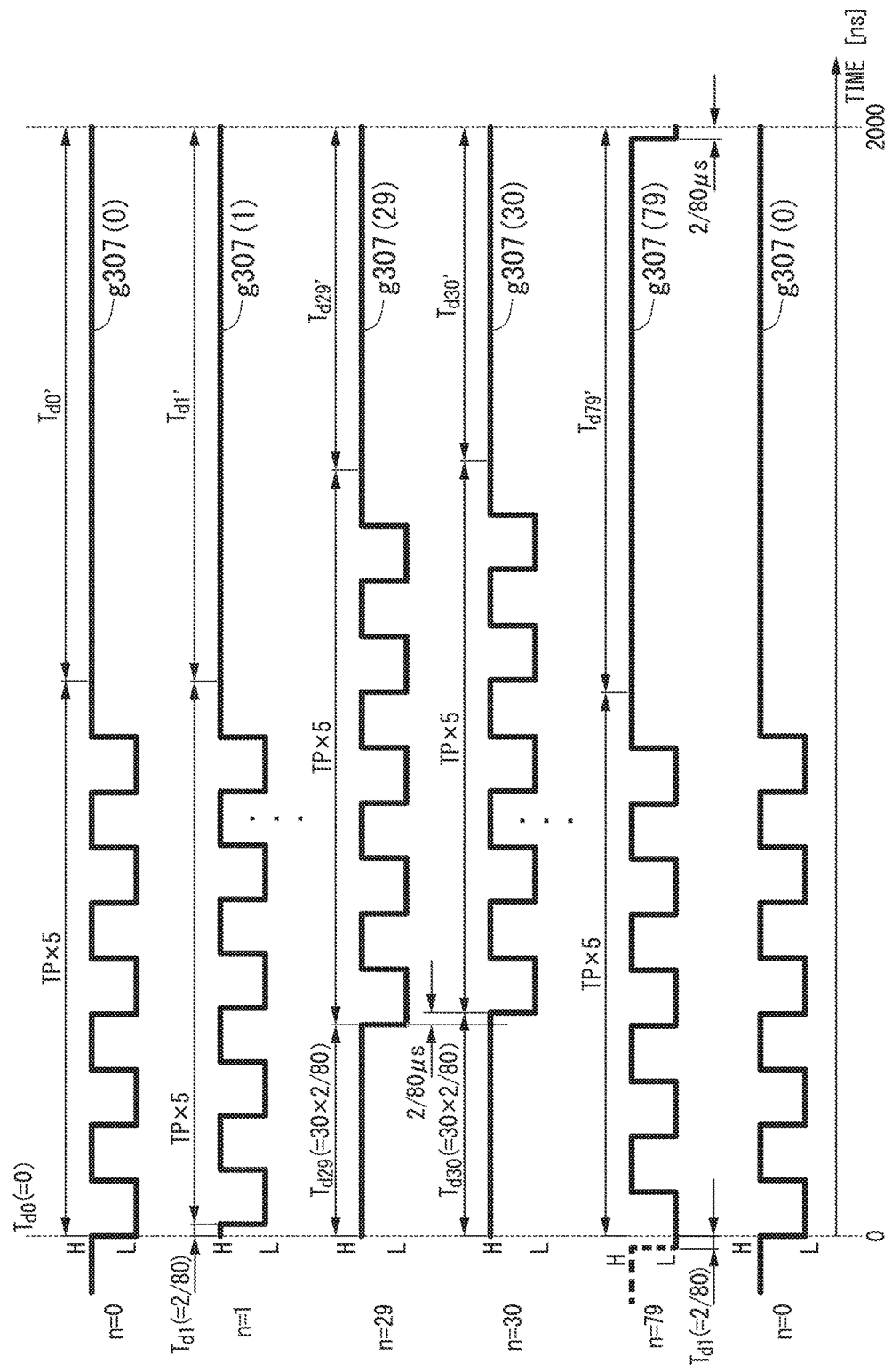
FIG. 14 is a view showing an example of a signal for each n according to the embodiment.

FIG. 14 is a view showing an example of the signal TX4 for each n according to the present embodiment. In FIG. 14, the horizontal axis represents time, and the vertical axis represents a H level and a L level of each signal. In FIG. 14, the signal at n=0 is represented as TX4(0), . . . , and the signal at n=79 is represented as TX4(79). The signal TX4 moves from left to right eighty times during time 0 to time 2000 [ns] in response to the control of the control unit 107.

A waveform g307(0) is a TX4 signal at n=0. At n=0, the delay duration $T_{d0}$ of the pulse TP is 0. That is, the waveform g307(0) is started from time 0.

Next, a waveform g307(1) is a TX4 signal at n=1. At n=1, the delay duration $T_{d1}$ of the pulse TP is 25 [nsec] (=2 [μsec]/80). That is, as shown in FIG. 14, the waveform g307(1) at n=1 is delayed by 25 [nsec] with respect to the waveform g307(0) at n=0.

Subsequently, the waveform is delayed by 25 [nsec] as n increases by one. Then, at n=79, like a waveform g307(79), only ¼ (=100 [nsec]/25 [nsec]) of the first L level duration $T_{low}$ of the pulse TP appears before 2000 [nsec], and the rest of the signal folds back to 0 [nsec].

Although omitted in FIG. 14, the drain gate signal also moves from left to right by 25 [nsec] in accordance with the movement of the TX4 signal in response to the control of the control unit 107.

<Detection of Delay Time (Lag Time)>

Next, a detection method of a delay time is described.

Figure 15:
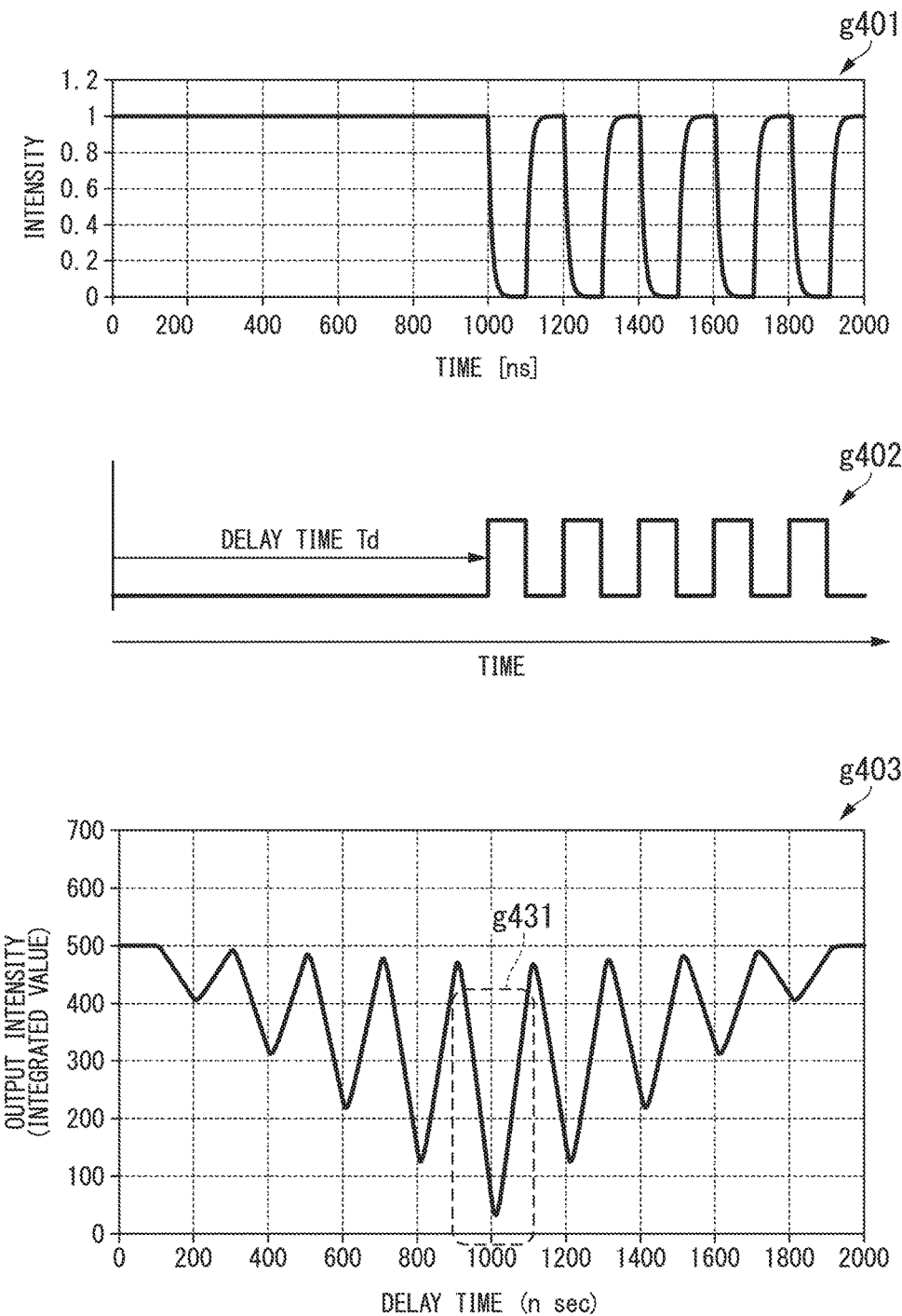
FIG. 15 is a view for describing detection of a delay time according to the embodiment.

FIG. 15 is a view for describing detection of a delay time according to the present embodiment.

In FIG. 15, the horizontal axis represents time, and the vertical axis represents a H level and a L level of each signal. A waveform g401 represents a waveform of a light emission pulse. A waveform g402 represents a signal TX4. The graph g403 represents an example in which eighty integrated intensity outputs (integrated value) at n=0 to 79 are sequentially connected when the delay time Td of the signal TX4 is changed. The example shown in FIG. 15 is an example in which the light emission pulse is started from a time of 1000 [ns].

As described by using FIG. 14, in the present embodiment, when receiving a light emission pulse (transmission signal), the delay time Td of the signal TX4 is sequentially changed. A time 0 represents an integrated value at n=0, . . . , and a time 2000 represents an integrated value at n=79. As described above, the signal TX4 moves by 25 [nsec] in accordance with the value of n, and thereby, the integrated value as shown in the graph g403 can be obtained.

As shown in FIG. 15, when a time when the timing at which the gate is opened by the signal TX4 is matched with the timing at which the light emission pulse is emitting is 1000 [ns], the integrated value is minimized.

Therefore, by obtaining a time when the integrated value is minimized, the delay time (lag time) can be obtained.

Next, an example of a detection method of the minimum value of the integrated value is described.

Figure 16:
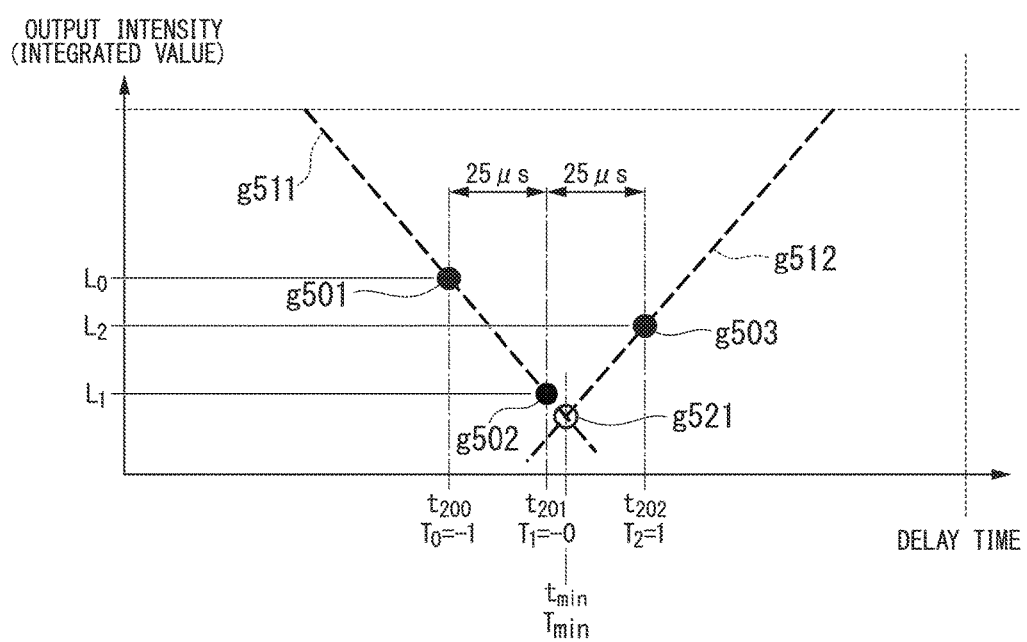
FIG. 16 is an enlarged view of a region represented by a reference numeral g431 of FIG. 15.

FIG. 16 is an enlarged view of a region represented by a reference numeral g431 of FIG. 15. In FIG. 16, the vertical axis is an output intensity (integrated value) of the pixel 201, and the horizontal axis is a delay time. A point g501 is an (m−1)-th (m is any one integer of 1 to 80) integrated value, a point g502 is an m-th integrated value, and a point g503 is an (m+1)-th integrated value. A line g511 is a line segment that passes through the point g501 and the point g502. A line g512 passes through the point g503 and is a line segment having a slope that is an opposite polarity to the slope of the line segment of the line g511.

As shown in FIG. 16, at the point g501, the delay time is too, and the output intensity is $L_0$. At the point g502, the delay time is $t_{201}$, and the output intensity is $L_1$. At the point g503, the delay time is $t_{202}$, and the output intensity is $L_3$. $T_0$ to $T_2$ are values obtained by normalizing the delay time.

In the example shown in FIG. 16, a method of calculating the position of a point g521 which is a true minimum value, that is, the delay time $t_{min}$ by using measurement values $L_0$ to $L_2$ which are measured is described.

In the example shown in FIG. 16, the magnitude relationship of the measurement values is $L_1 < L_2 < L_0$.

When the delay time t is normalized such that the before and after times become 1 using the delay time $t_{201}$ at which the measurement value L is minimized as a reference, T is represented by the following Expression (10).

$$T = (t - t_{201})/(t_{201} - t_{200}) \quad (10)$$

By obtaining an intersection point of the line g511 and the line g512 using Expression (10), the position of the true minimum value can be obtained. The line g511 is represented by the following Expression (11), and the line g512 is represented by the following Expression (12).

$$L = aT + b_n \quad (11)$$

$$L = -aT + b_p \quad (12)$$

In Expression (11) and Expression (12), "a" is a slope. In Expression (11), $b_n$ is an intercept. In Expression (12), $b_p$ is an intercept.

The normalized $T_0$ to $T_2$ are represented by the following Expressions (13) to (15) by using the delay times.

$$T_0 = (t_{200} - t_{201})/(t_{201} - t_{200}) = -1 \quad (13)$$

$$T_1 = (t_{201} - t_{201})/(t_{201} - t_{200}) = 0 \quad (14)$$

$$T_2 = (t_{202} - t_{201})/(t_{201} - t_{200}) = 1 \text{ (Here, in case of } t_{202} - t_{201} = t_{201} - t_{200}) \quad (15)$$

$L_0$, $L_1$, and $L_2$ are represented by the following Expression (16) to the following Expression (18) using Expression (11) to Expression (15).

$$L_0 = a \times (-1) + b_n = -a + b_n \quad (16)$$

$$L_1 = a \times (0) + b_n = b_n \quad (17)$$

$$L_2 = -a \times (1) + b_p = -a + b_p \quad (18)$$

The normalized minimum position $T_{min}$ is represented by the following Expression (19) using Expression (16) to Expression (18).

$$T_{min} = (L_2 - L_0)/2(L_1 - L_0) \quad (19)$$

The delay time $L_{min}$ at which the measurement value is minimized is represented by the following Expression (20) using Expression (19).

$$t_{min} = T_{min}(t_{201} - t_{200}) + t_{201} = \{(L_2 - L_0)(t_1 - t_0)/2(L_1 - L_0)\} + t_{201} \quad (20)$$

Next, an example of a sequence in which the minimum value of the delay time is obtained by using the above-described Expressions is described.

The control unit 107 detects the minimum one (for example, the point g502) of the eighty (n=0 to 79) integrated values. Subsequently, the control unit 107 detects integrated values (for example, the point g501 and the point g503) before and after the detected minimum value.

Subsequently, the control unit 107 calculates the expression of a straight line shown, for example, in Expression (16) of a line segment (for example, the line g511) that passes through two successive integrated values (for example, the point g501 and the point g502). Subsequently, the control unit 107 calculates the expression of a straight line shown, for example, in Expression (12) of a line segment (for example, the line g512) which has a slope that is an inverted polarity to the slope of the calculated line segment and which passes through the remaining integrated value (for example, the point g503). Subsequently, as described above, the control unit 107 estimates an intersection point of the calculated two straight lines as a true minimum value, for example, by using Expression (20) and calculates as a phase based on the estimated true minimum value.

In the example shown in FIG. 16, an example is described in which the true minimum value is estimated by using the integrated values before and after the minimum value; however, the number of the integrated values used for estimation of the minimum value may be three or more including the minimum value. The calculation method of a minimum value described above is an example and is not limited thereto.

As described above, in the present embodiment, the true delay time (lag time) and the synchronization error are calculated by using the apparent delay times (lag times) detected with each other. In the present embodiment, the calculated synchronization error is also transmitted to the terminal 10 of another vehicle that is communicable. Two vehicles that are traveling at a distance in which the two vehicles cannot optically communicate with each other receive the synchronization error from a vehicle that is traveling in a range in which the vehicle can optically communicate with the two vehicles. Thereby, in the present embodiment, when the two vehicles reach a range in which the two vehicles can optically communicate with each other, the two vehicles can calculate the inter-vehicle distance by using the synchronization error that has already been received without performing transmission and reception of the apparent delay time with each other. As a result, according to the present embodiment, the mutual communication amount between the terminals 10 of the vehicles can be reduced.

According to the present embodiment, even when the terminal 10 included in the vehicle 11 and the terminal 10 included in the vehicle 13 are at a distance in which the vehicles cannot directly communicate with each other, it is possible to share the synchronization error (relative phase) via the terminal 10 included in the vehicle 12, and therefore, it is possible to measure the synchronization error between the vehicle 11 and the vehicle 13. Thereby, in the present embodiment, when the first vehicle and the third vehicle become a state in which the vehicles can directly communicate with each other, it is possible to omit a time during which the vehicles synchronize with each other.

According to the present embodiment, by mutually performing transmission and reception of the transmission signal between two vehicles, it is possible to measure, for example, the apparent delay time between the vehicle 11 and the vehicle 12 in the vehicle 11 and the apparent delay time between the vehicle 11 and the vehicle 12 in the vehicle 12.

According to the present embodiment, by using the measured apparent delay time between the vehicle 11 and the vehicle 12 in the vehicle 11 and the measured apparent delay time between the vehicle 11 and the vehicle 12 in the vehicle 12, it is possible to calculate the synchronization error between the vehicle 11 and the vehicle 12. According to the present embodiment, it is possible to omit a time during which the vehicles synchronize with each other, and it is possible to calculate and thereby measure the distance between the vehicle 11 and the vehicle 12 based on the calculated synchronization error and the measured apparent delay time.

According to the present embodiment, by mutually performing transmission and reception of the transmission signal between the vehicle 12 and the vehicle 13, it is possible to calculate the synchronization error between the vehicle 12 and the vehicle 13. According to the present embodiment, the terminal 10 of the vehicle 12 transmits the calculated synchronization error between the vehicle 12 and the vehicle 13 to the vehicle 11, and thereby, the terminal 10 of the vehicle 11 can share the relative phase between the vehicle 12 and the vehicle 13. Thereby, according to the present embodiment, the terminal 10 of the vehicle 11 can calculate the synchronization error between the vehicle 11 and the vehicle 13 by using the synchronization error between the vehicle 11 and the vehicle 12 and the synchronization error between the vehicle 12 and the vehicle 13.

According to the present embodiment, when direct communication becomes available, the terminal 10 of the vehicle 11 measures the apparent delay time between the vehicle 11 and the vehicle 13. Then, according to the present embodiment, the terminal 10 of the vehicle 11 can calculate and thereby measure the distance between the vehicle 11 and the vehicle 13 based on the calculated synchronization error between the vehicle 11 and the vehicle 13 and the measured apparent delay time between the vehicle 11 and the vehicle 13.

According to the present embodiment, it is possible to change the transmission interval and the reception interval corresponding to the synchronization class included in the transmission signal, and therefore, it is possible to reduce the communication amount.

According to the present embodiment, the transmission signal, the delay time, and the synchronization error are transmitted using different communication means, and therefore, it is possible to transmit the transmission signal which is required to be transmitted at each time since the transmission signal is required to calculate the distance, and the delay time and the synchronization error that may be transmitted when the delay time and the synchronization error can be calculated at a different timing. Thereby, according to the present embodiment, it is possible to reduce the communication amount.

According to the present embodiment, with respect to the detection of the delay time, as shown in FIG. 13 and FIG. 14, the light emission timing of the light emission pulse is constant, and the reception timing is shifted by controlling the sort gate Txd at the time of reception.

Thereby, according to the present embodiment, the start timing of one pulse of the sort gate units is delayed for each predetermined time and for each predetermined number of times, and thereby, the delay time can be measured.

A program for realizing at least one of the functions of the demodulator 105, the decoder 106, the control unit 107, the encoder 108, and the modulator 109 of the terminal 10 in the embodiment of the invention may be recorded in a computer-readable recording medium, and the program recorded in the recording medium may be read into and executed on a computer system to thereby perform a process. It is assumed that the "computer system" used herein includes an OS or hardware such as peripherals. It is also assumed that the term "computer system" includes a WWW system including a homepage provision environment (or a display environment). The term "computer-readable recording medium" refers to a portable medium such as a flexible disk, a magneto-optical disk, a ROM, and a CD-ROM, or a storage device such as a hard disk embedded in the computer system. It is also assumed that the term "computer-readable recording medium" includes a medium which holds a program for a given time such as a volatile memory (RAM) in the computer system which becomes a server or a client when a program is transmitted through a network such as the Internet or a communication line such as a telephone line.

The program may be transmitted from the computer system which stores the program in the storage device or the like to other computer systems through a transmission medium or through transmission waves in the transmission medium. The term "transmission medium" which transmits the program refers to a medium which has a function of transmitting information, for example, a network (communication network) such as the Internet or a communication line such as a telephone line. The program may be a program which can realize part of the above-described functions. The program may be a so-called differential file (differential program) which can realize the above-described functions by a combination with a program already recorded in the computer system.

Although the embodiment of the invention has been described and shown, the invention is not limited to the above-described embodiment, and addition, omission, and substitution of the configuration and other changes can be made without departing from the scope of the invention.

The invention claimed is:

1. An inter-vehicle communication system between a first vehicle and a second vehicle, wherein
   a first terminal included in the first vehicle includes a first control unit that receives a first relative phase between a third vehicle and the second vehicle transmitted by a second terminal included in the second vehicle and calculates, based on the received first relative phase and a second relative phase between the first vehicle and the second vehicle, a third relative phase between the first vehicle and the third vehicle, and
   the second terminal includes a second control unit that transmits the first relative phase to the first vehicle,
   wherein in a scenario in which the first vehicle and the second vehicle are capable of optical communication with each other, and the first vehicle and the third vehicle are incapable of optical communication with each other, the first control unit calculates a distance between the first vehicle and the second vehicle based on the second relative phase, and a distance between the first vehicle and the third vehicle based on the third relative phase.

2. The inter-vehicle communication system according to claim 1, wherein
   an N-th (N is an integer of any one of one to three) control unit of an N-th terminal included in an N-th vehicle:
   transmits, to another vehicle, a transmission signal including information indicating a relative time and an identifier by which a vehicle is identified;
   receives the transmission signal transmitted by said another vehicle;
   measures, based on information indicating a relative time in another vehicle included in the received transmission signal and information indicating a relative time in a vehicle, an N-th delay time between the N-th vehicle and an M-th (M is an integer of any one of one to three other than N) vehicle in the N-th vehicle;

transmits the measured N-th delay time to the M-th vehicle;

receives an M-th delay time between the N-th vehicle and the M-th vehicle in the M-th vehicle transmitted by the M-th vehicle;

calculates a relative phase between the N-th vehicle and the M-th vehicle by using the N-th delay time and the M-th delay time; and calculates, based on the calculated relative phase and the measured N-th delay time, a distance between the N-th vehicle and the M-th vehicle.

3. The inter-vehicle communication system according to claim 2, wherein
an O-th (O is an integer of any one of one to three other than N and M) control unit of an O-th vehicle:
transmits the transmission signal to another vehicle;
receives the transmission signal transmitted by said another vehicle;
measures, based on information indicating a relative time in another vehicle included in the received transmission signal and information indicating a relative time in a vehicle, an O-th delay time between the M-th vehicle and the O-th vehicle in the O-th vehicle; and
transmits the measured O-th delay time to the M-th vehicle, and the M-th control unit of the M-th vehicle:
measures, based on information indicating a relative time in another vehicle included in the received transmission signal and information indicating a relative time in a vehicle, a delay time between the M-th vehicle and the O-th vehicle in the M-th vehicle;
calculates a relative phase between the M-th vehicle and the O-th vehicle by using the O-th delay time and a delay time between the M-th vehicle and the O-th vehicle in the M-th vehicle; and
transmits, to the N-th vehicle, the calculated relative phase between the M-th vehicle and the O-th vehicle.

4. The inter-vehicle communication system according to claim 3, wherein
the N-th control unit of the N-th vehicle:
receives the transmission signal transmitted by the O-th vehicle when the O-th vehicle is present at a communicable distance;
measures, based on information indicating a relative time in another vehicle included in the received transmission signal and information indicating a relative time in a vehicle, a delay time between the N-th vehicle and the O-th vehicle in the N-th vehicle; and
calculates, based on the calculated relative phase between the N-th vehicle and the M-th vehicle, the received relative phase between the M-th vehicle and the O-th vehicle, and the measured delay time between the N-th vehicle and the O-th vehicle in the N-th vehicle, a distance between the N-th vehicle and the O-th vehicle.

5. The inter-vehicle communication system according to claim 2, wherein
the transmission signal includes a synchronization class indicating an accuracy of a reference signal used by the control unit, and
the control unit changes, based on a first synchronization class in the control unit and a second synchronization class in the control unit of another vehicle, a communication interval of performing transmission and reception.

6. The inter-vehicle communication system according to claim 2, wherein
the terminal included in the vehicle includes a light reception unit that receives a light emission signal which is a transmission signal from said another vehicle,
the control unit calculates, based on a phase difference detected by the light reception unit, a distance between a vehicle and said another vehicle,
the light reception unit includes:
a photoelectric conversion unit in which a plurality of pixels are arranged and each of the pixels generates an electric charge corresponding to an exposure amount;
a first electric charge accumulation unit that accumulates the electric charge generated by the photoelectric conversion unit;
m (m is an integer of four or more) sort gate units that are provided between the photoelectric conversion unit and an electric charge accumulation unit and control entering of an electric charge from the photoelectric conversion unit to the electric charge accumulation unit according to opening and closing; and
(m−1) second to m-th electric charge accumulation units that accumulate the electric charge generated from the photoelectric conversion unit, and
one of the m sort gate units includes a delayed pulse that starts at each predetermined time and at each predetermined number of times and that has a delayed pulse timing.

7. The inter-vehicle communication system according to claim 2, wherein
the control unit transmits the transmission signal, the delay time, and the relative phase using different communication means.

8. An inter-vehicle communication method in an inter-vehicle communication system including a first vehicle that includes a first terminal that includes a first control unit, a second vehicle that includes a second terminal that includes a second control unit, and a third vehicle that includes a third terminal that includes a third control unit, the method comprising:
(a) by way of the second control unit, transmitting a first relative phase between the second vehicle and the third vehicle to the first vehicle;
(b) by way of the first control unit, receiving the first relative phase transmitted in (a);
(c) by way of the first control unit, calculating, based on the first relative phase received in (b) and a second relative phase between the first vehicle and the second vehicle, a third relative phase between the first vehicle and the third vehicle; and
(d) by way of the first control unit, in a scenario in which the first vehicle and the second vehicle are capable of optical communication with each other, and the first vehicle and the third vehicle are incapable of optical communication with each other, calculating a distance between the first vehicle and the second vehicle based on the second relative phase, and a distance between the first vehicle and the third vehicle based on the third relative phase.

* * * * *